(12) United States Patent
Schneider

(10) Patent No.: US 12,391,290 B2
(45) Date of Patent: Aug. 19, 2025

(54) INTERMODAL TRANSPORTATION SYSTEM

(71) Applicant: Daniel J. Schneider, Annandale, VA (US)

(72) Inventor: Daniel J. Schneider, Annandale, VA (US)

( * ) Notice: Subject to any disclaimer, the term of this patent is extended or adjusted under 35 U.S.C. 154(b) by 47 days.

(21) Appl. No.: 18/364,202

(22) Filed: Aug. 2, 2023

(65) Prior Publication Data

US 2023/0406368 A1    Dec. 21, 2023

Related U.S. Application Data

(63) Continuation of application No. 17/013,365, filed on Sep. 4, 2020, now Pat. No. 11,753,051.

(60) Provisional application No. 62/896,366, filed on Sep. 5, 2019.

(51) Int. Cl.
| | |
|---|---|
| *B61D 47/00* | (2006.01) |
| *B61B 1/00* | (2006.01) |
| *B61C 3/00* | (2006.01) |
| *B61D 3/20* | (2006.01) |

(52) U.S. Cl.
CPC ............ B61D 47/005 (2013.01); B61B 1/005 (2013.01); B61C 3/00 (2013.01); B61D 3/20 (2013.01)

(58) Field of Classification Search
CPC .. B61B 1/005; B61C 3/00; B61D 3/20; B61D 47/005
See application file for complete search history.

(56) References Cited

U.S. PATENT DOCUMENTS 2,815,720 A    12/1987    Baeseler

FOREIGN PATENT DOCUMENTS

| DE | 943296 C | 5/1956 | |
|---|---|---|---|
| EP | 0084823 A1 | 8/1983 | |
| EP | 2689984 A1 * | 1/2014 | ........... B62D 53/005 |
| GB | 2015970 A | 9/1979 | |

OTHER PUBLICATIONS

International Search Report issued in International Application PCT/US2020/049549 on Nov. 25, 2020.

* cited by examiner

*Primary Examiner* — Robert J McCarry, Jr.
(74) *Attorney, Agent, or Firm* — Arnold & Porter Kaye Scholer LLP

(57) ABSTRACT

A system for improved intermodal freight transportation is described herein. Improved carriages and support trusses are provided that beneficially move the load-bearing structure to interconnected support trusses forming a top-end spine of the train with freight containers equipped with wheels hanging underneath. Upon entering a terminal, the floor adjacent to the rails may be configured to gradually rise until the container's wheels are supporting the container's weight. When properly aligned with a container exchange station, the container's connections to the train may be configured to release the container from the train, and the container's wheels may be configured to pivot, allowing the container to be rolled to the side of the train and replaced by another. This may allow the container to be replaced without having to lift the container or disconnect any of the rolling stock components.

19 Claims, 23 Drawing Sheets

SECTION A-A

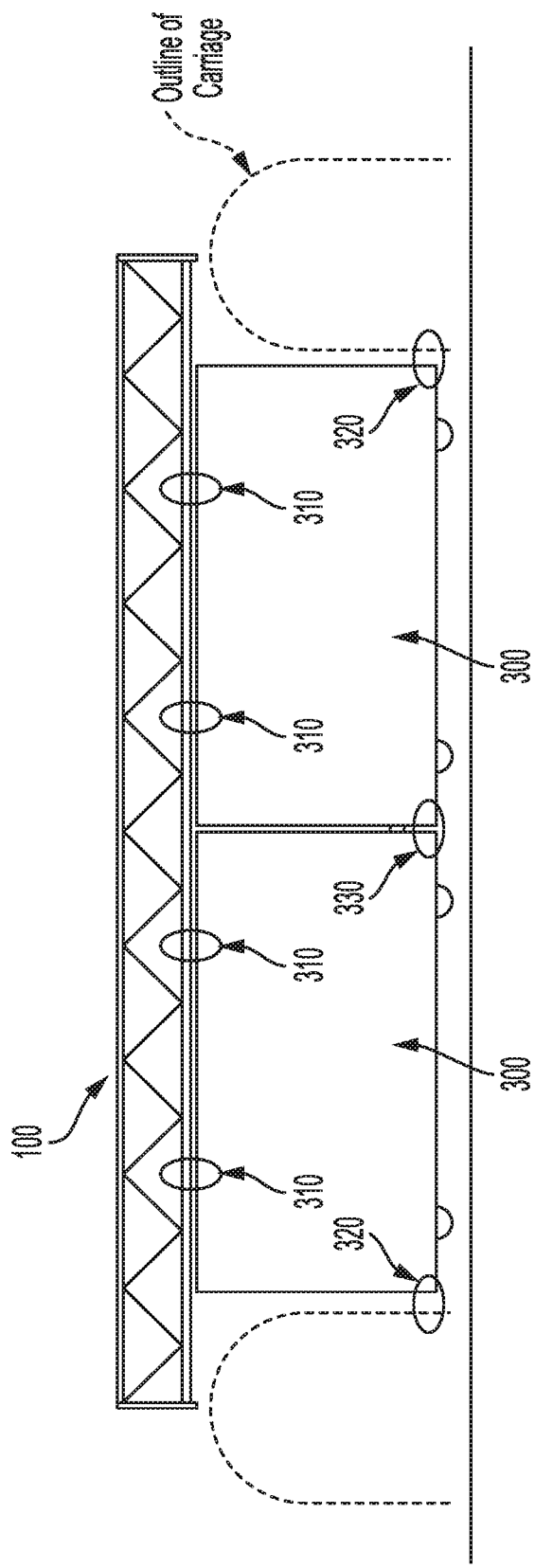

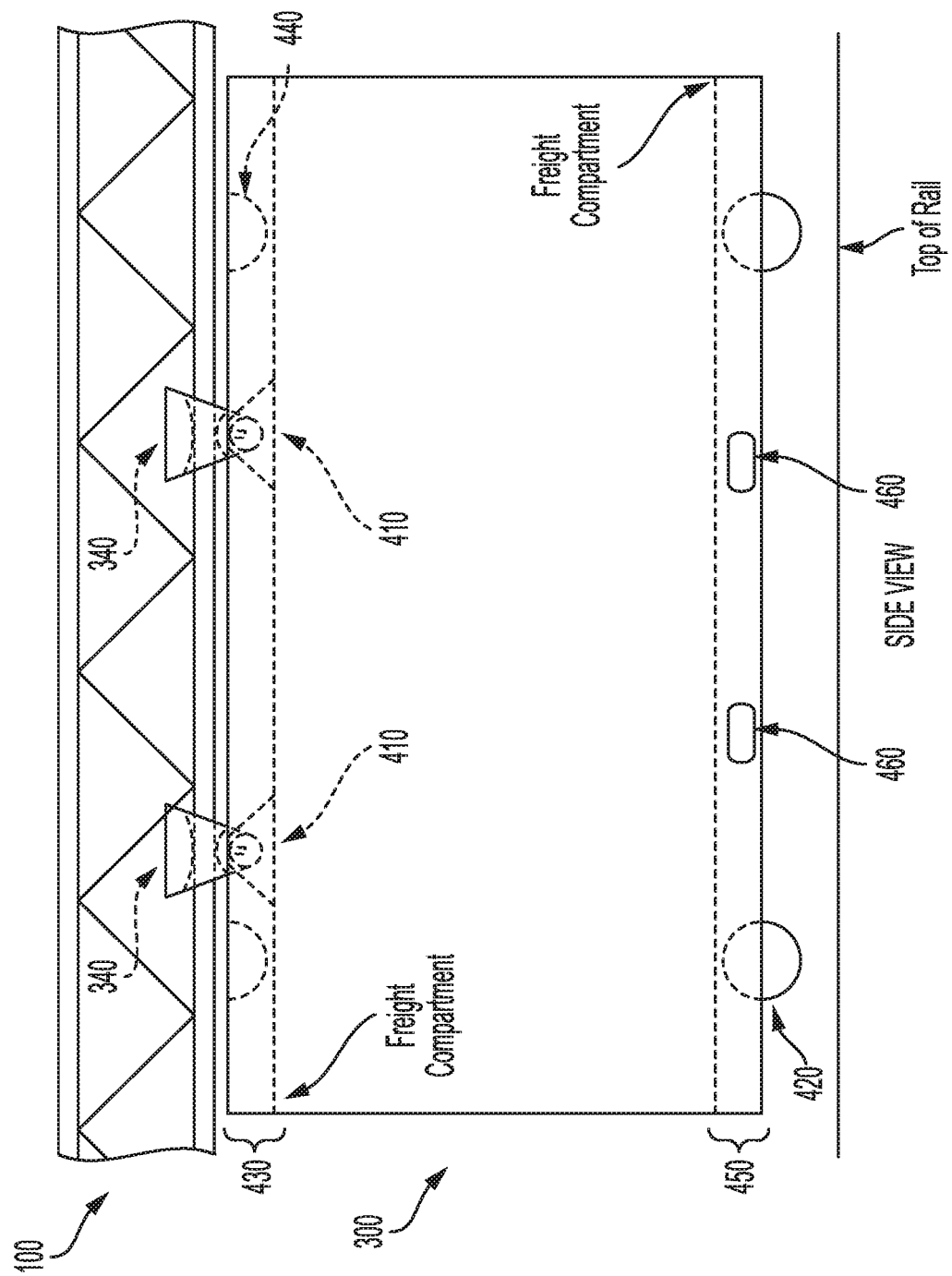

END VIEW

INTERMODAL TRANSPORTATION SYSTEM

RELATED APPLICATIONS

This application is a continuation of U.S. Non-Provisional application Ser. No. 17/013,365 filed Sep. 4, 2020, entitled "Intermodal Transportation System," which claims priority to U.S. Provisional Application No. 62/896,366 filed Sep. 5, 2019, entitled "Intermodal Transportation System and Components Thereof," the contents of each of which is incorporated herein by reference in its entirety.

FIELD OF THE INVENTION

The present invention relates to improvements to intermodal freight transportation and components thereof.

BACKGROUND OF THE INVENTION

The movement of freight, whether finished goods or raw materials, from production site to marketplace is essential to any modern economy. Intermodal freight transport involves the transportation of freight in an intermodal container or vehicle using multiple modes of transportation (e.g., rail, ship, and truck) and is commonly used to transport finished goods or raw materials. Even though trucking is the least energy efficient mode of ground freight transportation, it is typically used more frequently than rail transport, which is comparatively more efficient, safer, and facilitates transportation of larger volumes of goods. Even though trucking rates are higher than rail's, the vast majority of high-value finished goods move by truck because the overriding concerns of shippers are speed and the predictability of delivery times, which allows them to control inventory costs, hold down prices, and remain competitive. The operating characteristics of conventional railroad equipment make it very difficult for the railroads to compete with trucking when measured by these criteria.

Regrettably, our reliance on trucking results in much higher greenhouse gas (GHG) emissions since it produces three to four times the air pollution of intermodal rail service per ton-mile. Trucking also imposes other costs on society. For example, reliance on trucking results in increased highway congestion, which results in the purchase and consumption of billions of gallons of additional fuel and billions of man-hours wasted sitting in traffic. Heavy trucks are also responsible for over 90% of the highway pavement damage caused by vehicles, despite accounting for fewer than 10% of highway vehicle miles traveled. Accidents involving heavy trucks kill seven to eight times more people and injure approximately 25 times more people than railroads each year.

It would be beneficial to industry and society if there were a modal shift to rail freight transport, where the energy efficiency of steel wheels on steel rails is well understood and other external costs are mitigated. However, there are technical/design hurdles to this goal that have gone largely unaddressed. As such, there is a need to address the inherent limitations in the design and operation of conventional railroad equipment to facilitate the desired modal shifts.

A conventional train is assembled by coupling together a series of railcars and as it moves through the network, it is stopped and disassembled at classification yards where the cars are grouped into blocks having similar destinations. These classification yard activities are equipment, labor, and energy intensive and the site of many employee injuries. Railcars are then held until enough blocks are assembled to dispatch a train, which typically takes an entire day. Depending on a shipment's route, it might pass through several such yards and could also be transferred from one railroad to another, causing further delays. Then the "last step", i.e., the final delivery or pickup at scattered locations, remains a challenge for railroads due to the heavy commitment of labor and equipment involved. As a result, railcars are once again held until adequate volume is assembled to justify dispatching a local train. These operating characteristics hamper the railroads' ability to compete with trucking for high-value freight where speed and predictable delivery times are key components of customer satisfaction, and as a consequence, the carload service (i.e., the loading of freight onto or into rail cars) described above represents a diminishing share of railroad revenue.

Rail intermodal, where the fuel and labor efficiency of rail are used on the long-haul portion of a trip and trucks are used to gather the loads and make final deliveries, addresses service and efficiency issues in part, and has grown to become the largest single source of U.S. freight rail revenue. Railroad companies have improved the efficiency of their intermodal service by using unit trains to avoid classification yards and double-stack well cars to increase load density. However, due to the size of these unit trains and the volume of containers they carry, intermodal terminals have grown in size and fallen in number, limiting the markets served by efficient intermodal freight transportation to only the largest urban areas. The resulting concentration of truck traffic, with its noise and air pollution, has made them politically unpopular, while their large land requirements have forced them to locate in relatively remote areas which increases drayage costs. Further, the average dwell time for containers in these large intermodal terminals can exceed hours. So, in effect, while striving to overcome the friction and inefficiency inherent in conventional railroad operations, the industry has made adjustments that introduce other inefficiencies that tend to limit the markets they serve. They've doubled-down on what they perceive as their primary competitive advantage—moving large, heavy things using less energy and labor—at a time when shippers are moving toward smaller, more frequent shipments. As a result, containers may be shipped via truck instead of rail because rail transport may simply take too long. For example, containers are often drayed from Chicago to Pittsburgh, a distance of over 450 miles, because shipping by rail would take much longer. Drayage costs combined with the lift cost to place containers on trucks and/or railcars at either end of the trip, has restricted the breakeven distance for intermodal service to shipments of greater than 500 miles even though more than 80% of freight tonnage moves less than 500 miles.

In order to shift a meaningful share of freight from the highways to the rails, improvements in the operating characteristics of intermodal service are needed to enable railroads to offer service that is competitive with trucking over shorter distances and for smaller loads.

SUMMARY OF THE INVENTION

Various embodiments of the present disclosure may include systems for improved intermodal freight transportation. The systems described herein may include a structural redesign of conventional railcars, where the redesign may include carriages and support trusses that beneficially move the load-bearing structure to interconnected support trusses forming a top-end spine of the train with the freight containers hanging underneath. These support trusses, when coupled together, may provide the train with the train's linear integrity. In various embodiments, the freight containers may be equipped with wheels. Upon entering a terminal, the floor adjacent to and between the rails may be configured to gradually rise until the container's wheels are supporting the container's weight. When properly aligned with a container exchange station (CES), the container's connections to the train may be configured to release the container from the train, and the container's wheels may be configured to pivot, allowing the container to be rolled to the side of the train and replaced by another. This may allow the container to be replaced without having to lift the container or disconnect any of the train's rolling stock components. The systems described herein may address the various shortcomings discussed above and provide additional or alternative benefits over conventional intermodal transportation systems. In various embodiments, the systems described herein address these shortcomings without requiring any modification to existing infrastructure, such as, e.g., railroad tracks and/or switches, among others.

In various embodiments, the improved intermodal freight transportation system may include a support truss configured to transfer container loads to carriages and connect the train longitudinally at couplers. Together, the trusses and couplers form an articulated spine at the top of the train that eliminates slack action. In various embodiments, a connecting pin may be welded vertically to one or both ends of the support truss and slip into a slotted cylinder in a coupler, allowing the support truss to swivel but hold them vertical. In various embodiments, the support truss may be tapered to the connecting pin (at one or both ends), enabling the support truss to pivot at the coupler during cornering. In various embodiments, individual support trusses may house electrical and/or control wiring. For example, wiring may be placed inside hollow tubes of the trusses. In some embodiments, inserting the connecting pins into the slotted cylinder of the coupler from above causes the electrical and/or control wiring circuits between trusses to be completed. In some embodiments, additional equipment may be included to increase the load capacity of a truss. For example, a cable may be attached to adjacent support trusses (e.g., via hooks at either end of the cable), and a jack placed on top of the connecting pins may be configured to place the cable in tension to reduce deflection in the support trusses and increase its load capacity.

In various embodiments, the support trusses may include mechanical hooks attached to the support truss and configured to quickly grasp and release containers in order to facilitate efficient loading and unloading. In various embodiments, the length of the support truss and the spacing of mechanical hooks may enable two containers to be accommodated between carriages. The mechanical hooks may include tapered ends to easily thread support loops on top of a container and expand to form a tight connection that minimizes vertical movement. In various embodiments, the location of the hooks and/or support loops may be predetermined to evenly distribute the load. In various embodiments, the connection of the mechanical hooks to the containers via the support loops may form an axle between the container and the support truss. In various embodiments, the mechanical hooks may be configured to pivot around and be supported by the bottom chord of the support truss. In some embodiments, safety latches may be provided to prevent containers from being jostled off the hooks.

In various embodiments, an improved freight container may be provided for use with the support truss. In various embodiments, rollup doors at both ends of individual containers may be operable from inside and/or outside to enable two containers on a flatbed to be loaded and unloaded similar to a semi-trailer. In some embodiments, carriages and drayage trucks may be equipped with shrouds to deflect rain when moving. In various embodiments, a standardized location and size for the wheels of the containers may enable the containers to be stacked during storage and/or while on ships. Wheelsets of individual containers may have a steering mechanism equipped with a retractable drawbar at each end. In some embodiments, the steering mechanism may also permit sideways movement when both drawbars are retracted so the containers can be pushed in and out of position beneath the trusses when loading and unloading.

In various embodiments, the improved intermodal freight transportation system includes an improved container exchange system for use with the support truss described herein. When a train having an improved design as described herein enters a terminal, the floor elevation adjacent to and between the tracks may be gradually raised until the containers' wheels are supporting them. In various embodiments, the train may be stopped when the container(s) scheduled for offloading are positioned over the correct CES. Once properly aligned, the arriving container will be disconnected from the train and the wheels of the container are rotated by the CES's pivoting floor plates, which also serve to bridge the rail slots along container wheel guideways. When the containers are properly aligned and disconnected from the train, the containers may be moved off to the side while a departing container may be simultaneously moved into position under the truss from an adjacent queuing station. The pivoting floor plates may then pivot back to their original position, the container hook and bottom chord connections are made, and the train departs or moves forward to exchange the next series of containers.

These and other objects, features, and characteristics of the system disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The drawings are provided for purposes of illustration only and merely depict typical or example embodiments. These drawings are provided to facilitate the reader's understanding and shall not be considered limiting of the breadth, scope, or applicability of the disclosure. For clarity and ease of illustration, these drawings are not necessarily drawn to scale.

FIG. 3A is a side view of a block diagram of example containers attached to an example support truss, according to an embodiment of the invention.

FIG. 4A is a side view of a block diagram of an example freight container attached to a support truss, according to an embodiment of the invention.

DETAILED DESCRIPTION OF THE INVENTION

The invention described herein relates to systems for improved intermodal freight transportation. This improved intermodal freight transportation system may in part be described as an assembly of a series of standardized, interchangeable components that—when properly connected—form a train with enhanced capabilities. For example, in various embodiments, a train according to the invention described herein may comprise rolling stock components, including carriages having an integrated pivoting coupler assembly (PCA), support trusses, and control cars at one or both ends with freight containers hanging beneath the trusses. In various embodiments, the support trusses may be configured to connect to couplers at the top of the carriages. When connected via couplers, the support trusses may form an articulated spine that provides linear integrity to the train. In various implementations, containers and power packs or generators hanging beneath the support trusses may also be linked to one another and to the lower end of each adjacent carriage to form a second linear connection at the bottom of the train that works in conjunction with the pivoting coupler assemblies of the carriages to enhance the train's stability and cornering characteristics. In various implementations, each of these hanging components may be removable to enable them to be replaced with others at terminals in an automated fashion. Removing and replacing these components may take only moments and require no lifting. In various embodiments, a control car situated at the front and/or back of a train may be configured to sense changes in curvature in the track to provide control over the train (i.e., the trusses supporting containers and the carriages configured to connect the trusses and containers via pivoting coupler assemblies) when cornering/flexing. It will be appreciated by those having skill in the art that the embodiments described herein may be practiced without these specific details or with an equivalent arrangement. In various instances, well-known structures and devices are shown in block diagram form to avoid unnecessarily obscuring the embodiments.

Support Trusses

Figure 1A:
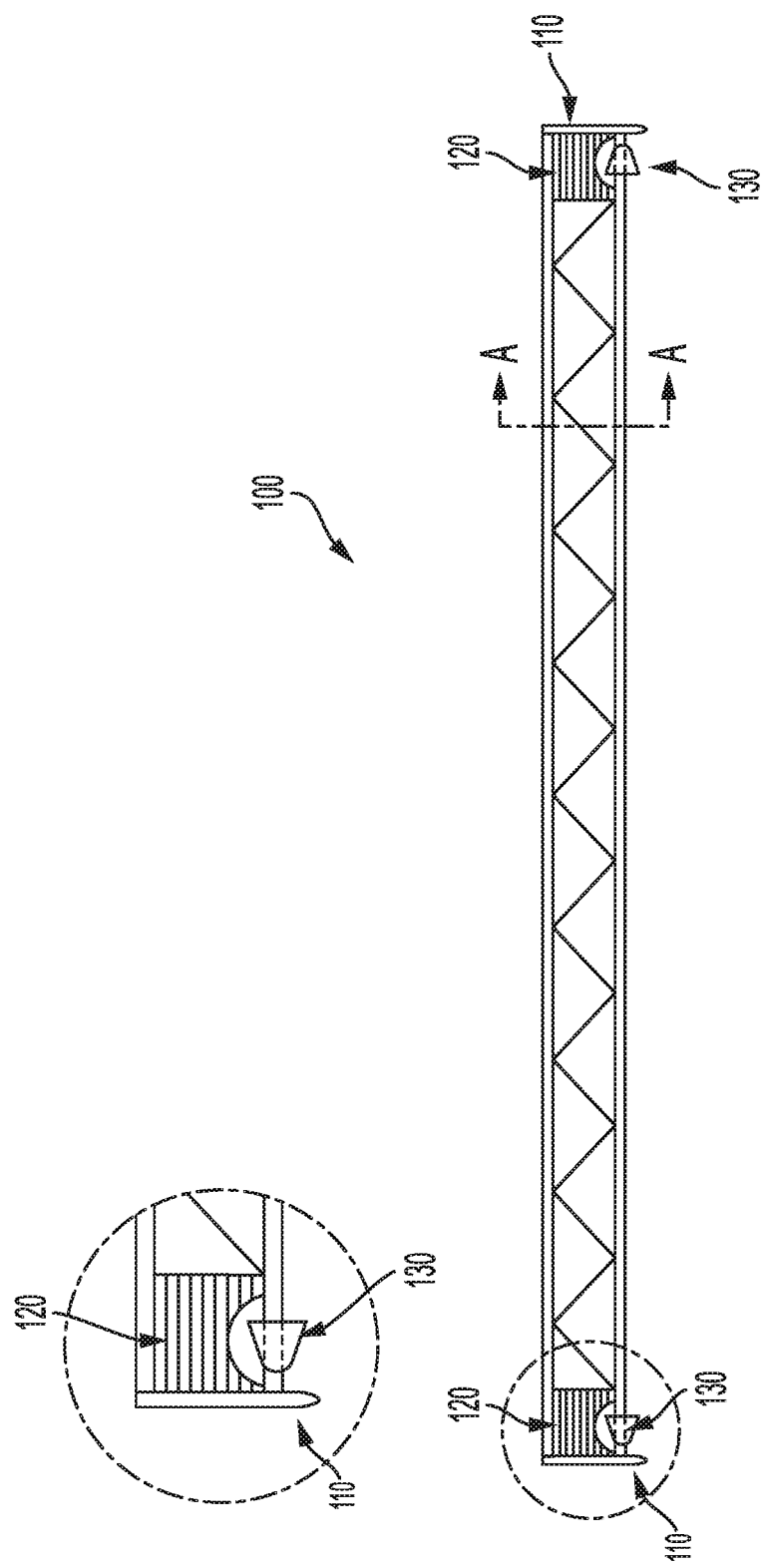
FIG. 1A is a side view of a block diagram of an example support truss, according to an embodiment of the invention.
Figure 1C:
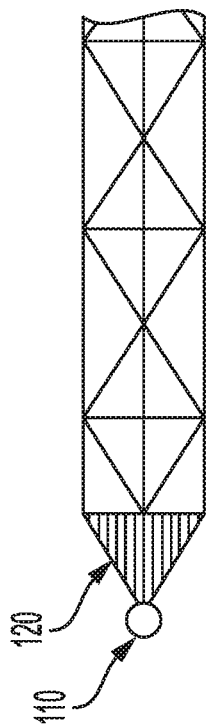
FIG. 1C is a top view of a block diagram of one end of an example support truss, according to an embodiment of the invention.
Figure 1B:
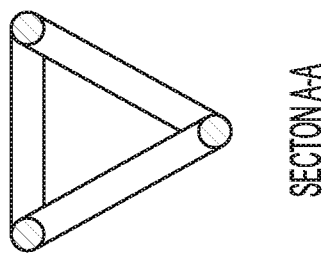
FIG. 1B is a cross-section view of a block diagram of an example support truss, according to an embodiment of the invention.

FIG. 1A is a side view of a block diagram of a support truss 100, according to an embodiment of the invention. In various embodiments, support truss 100 may be configured to transfer container loads to carriages and connect the train longitudinally at couplers. In various implementations, the length of a train comprising the components described herein may be defined by the number of support trusses 100 that make up the train. The number of support trusses 100 may indicate the number of freight containers the train is able to transport. In various implementations, a train may always have at least one more carriage than support truss to ensure each support truss 100 is supported by at least two carriages. In various embodiments, individual support truss 100 may house the electrical (power) and/or control wiring harness. For example, support truss 100 may have (internally and/or by external attachment) one or more wiring harnesses that house power-wiring and/or electrical wiring to distribute power, energy, and/or electrical signals (e.g., diagnostic data, instructions, and/or other signals) across support truss 100 to each component along the entire length of the train. In some embodiments, the tube at the bottom chord of support truss 100 may be configured to house electrical and/or control wiring. For example, wiring may be placed inside the hollow tubes of some or all of the trusses. In some implementations, each and every support truss 100 of a train may house electrical and/or control wiring in order to form a train-wide power grid and/or control system. In various embodiments, support truss 100 may include a mechanism for grasping containers from above. In various embodiments, support truss 100 may comprise a tubular space frame with a triangular cross-section. For example, FIG. 1B shows a cross-section view of support truss 100 along line A-A of FIG. 1A. Lightweight but strong, support truss 100 may be configured to utilize established technology. In various embodiments, the length of support truss 100 and the spacing of container hooks may enable two containers to be accommodated between carriages. For example, a single support truss 100 may be 50 feet in length. In other embodiments, containers may be built in different lengths that allow for one or more containers to be accommodated. The length of the carriages and/or trusses may be varied as well. In an example implementation, the length of the support trusses 100 and/or the containers may be optimized based on demand. Based on the length of the support trusses 100 and/or the containers, various components described herein (such as the location of container hooks, the configuration of container exchange systems, and/or other components of the intermodal freight transportation system) may be manufactured and/or modified accordingly.

In various embodiments, support truss 100 may include at least one connecting pin 110, one or more welded steel plates 120, one or more cone-shaped roller bearings 130, and/or one or more other components. In various embodiments, a connecting pin 110 may be provided at each end on support truss 100. Individual support trusses 100 may be connected longitudinally at couplers. For example, each individual support truss 100 may be connected to a coupler as described further herein with respect to FIGS. 7A, 7B, and 7C. In various embodiments, the connecting pins 110 may be welded vertically to each horizontal end (i.e., the front and back of support truss 100) and slip into a slotted vertical cylinder in a coupler from above. When fully engaged, inserting the connecting pins 110 into the coupler may cause the power and control wiring circuits to be completed. In various embodiments, the pin-coupler assembly may include power circuits and/or circuit connections that provide immediate feedback to a conductor regarding the quality of the connections between the support trusses and couplers. For example, the circuit may be completed when the pin is fully inserted and/or locked into place within the slotted vertical cylinder of the coupler, which may cause a diagnostic display to be updated accordingly. In some embodiments, inserting a pin of a first support truss into a coupler may complete an electrical circuit between the first support truss and a second support truss connected to the coupler. In the foregoing embodiment, completing the electrical circuit may cause a notification to be provided to a conductor device indicating that the first support truss is connected to the second support truss via the coupler (or the carriage comprising the coupler). In an example embodiment, immediate diagnostics and a green light display in the operator's cabin may be configured to confirm proper contacts. Together, the trusses and couplers form an articulated spine at the top of the train that eliminates slack action. This articulated spine formed by connecting each individual support truss to a coupler (i.e., a first carriage connected to a first support truss and a second support truss, a second carriage connected to the second support truss and a third support truss, and so on) may be referred to herein as the top chord of the train. Notably, in various embodiments, individual support trusses 100 may not be directly connected to one another. Rather, individual support trusses are connected to a coupler of a carriage, and the connection of two individual support trusses 100 to a single carriage may complete an electrical circuit between the two support trusses.

In various embodiments, support truss 100 may be tapered to connecting pin(s) 110, enabling support truss 100 to pivot at the coupler connection during cornering. For example, FIG. 1C shows a top view of a block diagram of one end of support truss 100, wherein support truss 100 is tapered to connecting pin 110. In some embodiments, support truss 100 may include one or more welded steel plates 120 to reinforce the tapered end of the truss. In various embodiments, support truss 100 may include a cone-shaped roller bearing 130 at one or both ends of the truss. In various embodiments, cone-shaped roller bearing 130 may be configured to interface with a coupler's support plate. For example, the cone-shaped roller bearing 130 may be configured to rest on the coupler's support plate 720 and provide uniform support when the truss pivots. In some embodiments, the welded steel plates 120 may include depression 140, which may enable the cone-shaped roller bearing 130 to rotate without interference. As described further herein with respect to FIGS. 7A, 7B, and 7C, connecting pin 110 may be locked into the slotted vertical cylinder of the coupler when inserted from above.

In some embodiments, an assembled train comprising one or more of the components described herein may include one or more power supplies mounted on support truss 100. For example, the train may include electrical generator(s), gas-powered engine(s), one or more batteries, and/or other power supplies that are mounted on support truss 100 in any number of ways. In some embodiments, these power generators or battery packs may be mounted on wheeled platforms with an overhead framework that attaches to support truss 100. In some embodiments, an adjacent carriage to a power generator or battery pack may connect to the power generator or battery pack using the same connections as it would connect to a freight container, as described herein. In the foregoing embodiments, power generators or battery packs may be similarly connected to adjacent power generators or battery packs and/or to adjacent containers in order to connect each container/power cell on the train. In some embodiments, power generators or battery packs may similarly be configured to be offloaded or disconnected from a train using a CES as described herein with respect to freight containers attached to support truss 100. For example, power generators or battery packs may similarly roll off a train via the pivoting floor plates of a CES. In various embodiments, a power supply may generate or supply power for locomotion. In some embodiments, the power supply may be "on-demand" and engaged or disengaged as needed by the train for efficiency. In some embodiments, the power supply may store energy generated from braking. Power that has been generated and/or stored may be distributed to an ad-hoc power grid serving the entire train.

Figure 2:
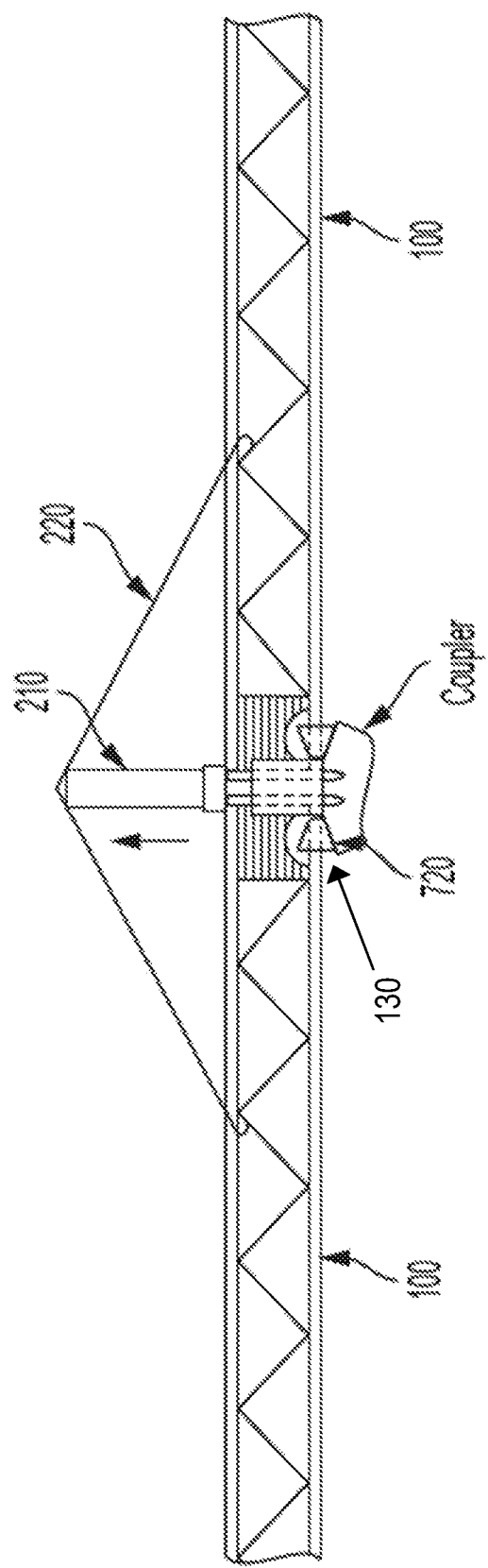
FIG. 2 is a side view of a block diagram of an example jack configured to increase the load capacity of the example support truss depicted in FIGS. 1A, 1B, and 1C, according to an embodiment of the invention.

In some embodiments, additional equipment may be included to increase the load capacity of a truss. For example, FIG. 2 shows a block diagram of an example jack configured to increase the load capacity of the example support truss depicted in FIGS. 1A, 1B, and 1C, according to an embodiment of the invention. In some embodiments, a jack 210 may be placed on top of the connecting pins 110 and/or the coupler connecting individual support trusses 100 via connecting pins 110. For example, connecting pins 110 may comprise hollow pins, and small posts beneath a base of jack 210 may be configured to fit inside the hollow pins. In some embodiments, a cable 220 may be attached to adjacent support trusses 100. For example, cable 220 may include hooks at either end for attaching to the adjacent trusses 100. In some embodiments, cable 220 may comprise a steel cable. As depicted in FIG. 2, jack 210 may be configured to place cable 220 in tension before the trusses 100 are loaded with weight. In other words, cable 220 may be jacked up via jack 210 to remove slack. This configuration of jack 210 and cable 220 may reduce deflection in support truss 100 and increase its load capacity. With the increased height of this configuration above support truss 100, consideration may be given to avoid exceeding the loading gauge of routes with low clearances.

In various embodiments, connection components attached to support truss 100 may be configured to quickly grasp and release containers in order to facilitate efficient loading and unloading. For example, FIG. 3A shows a side view of a block diagram of container(s) 300 attached to support truss 100 at connection point(s) 310, according to an embodiment of the invention. In various embodiments, container(s) 300 may be attached to support truss 100 via one or multiple connection components at one or more connection points 310. For example, each container 300 may be attached to support truss 100 at a predetermined number of connection points 310. In some embodiments, each container 300 may be attached to support truss 100 at a single connection point 310. In other embodiments, each container may be attached to support truss 100 at two or more connection points 310. For example, as depicted in FIG. 3A, each container 300 may be attached to support truss 100 at two connection points 310.

In various embodiments, the bottom of container(s) 300 may be connected to a swinging arm of a pivoting coupler assembly at position 320 of container(s) 300. For example, the bottom of container(s) 300 may be connected at position 320 of container(s) 300 to a swinging arm of a pivoting coupler assembly as described further with respect to FIGS. 8A-D. The connection at the bottom of a container 300 to the swinging arm of the pivoting coupler assembly, which in turn is connected to the bottom of another container 300, may form and be referred to herein as the bottom chord of the train. In various embodiments, containers 300 attached to a single support truss 100 may be connected at the bottom chord of the train and cause the containers 300 to act in unison. For example, in various embodiments, each support truss 100 may be configured to support two containers 300. The two containers 300 may be rigidly (but detachably) connected at the centerline of the bottom plane of the containers 300 (e.g., position 330 of container(s) 300). This connection may cause the containers 300 to move in unison and lend the combined structural rigidity of the container(s) 300 to the framework of the train. By resisting any flexing or sagging in the truss, this connection will shift the load vectors toward the hooks closest to the carriages, increasing the carrying capacity of the truss.

Figure 3B:
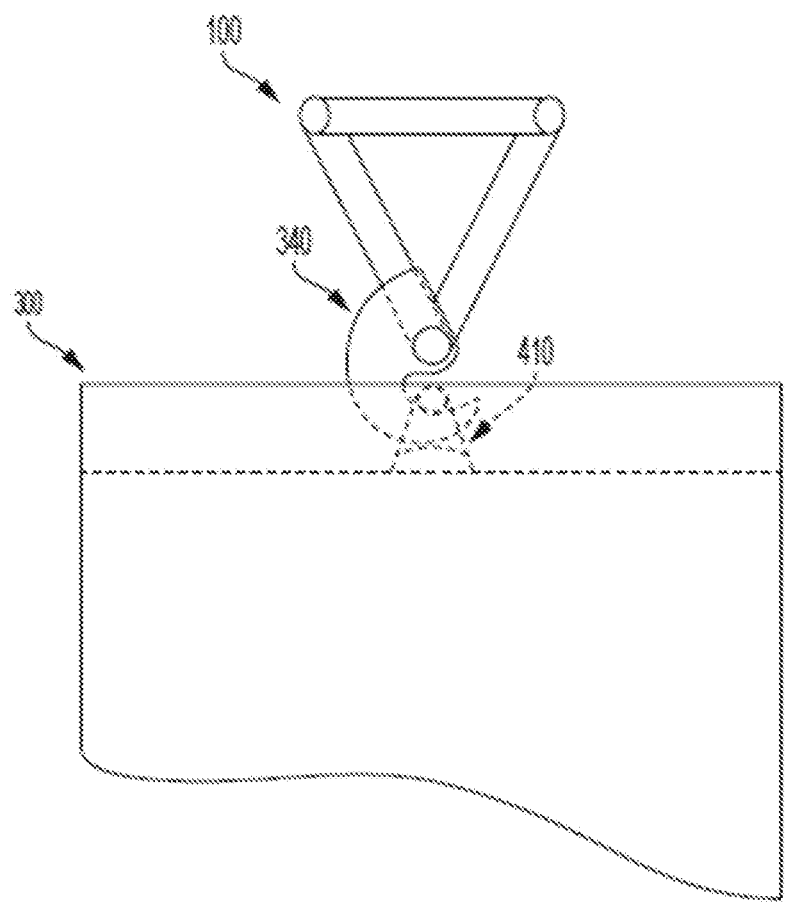
FIG. 3B is an end view of a block diagram of example containers attached to an example support truss via mechanical hooks, according to an embodiment of the invention.

In various embodiments, connection components attached to support truss 100 may be configured to mechanically, magnetically, and/or otherwise attach and release containers to support truss 100. For example, the connection components attached to support truss 100 may be configured to grasp and release container(s) 300 at predetermined holes, loops, or threads of the container(s) 300. In some embodiments, the connection components may comprise mechanical hooks and/or other support means or catches from which a container 300 may be hung from support truss 100. For example, FIG. 3B shows an end view of a block diagram of container(s) 300 attached to support truss 100 via mechanical hooks 340, according to an embodiment of the invention. The curved spiral design of mechanical hooks 340 may include tapered ends to easily thread support loops on top of a container 300 and expand to form a tight connection that minimizes vertical movement. In various embodiments, the support loops may be positioned along the centerline of container 300 to assure proper alignment with support truss 100. To accommodate a limited amount of rotation, the top of the support loops may be equipped with one or more roller bearings.

In various embodiments, the connection of the mechanical hooks 340 may form an axle of the support truss 100 on which the hooks are installed. In various embodiments, the location of the hooks 340 may distribute the load evenly along the length of support truss 100. Indeed, as described above, each container 300 may be attached to support truss 100 at a predetermined number of connection points 310. The location of the predetermined number of hooks 340 may be predetermined to evenly distribute the load, to simplify the structural design of the trusses and/or the containers (e.g., by moving the hook/loop connections towards the ends of the container(s) 300), and/or based on one or more other factors.

Figure 3C:
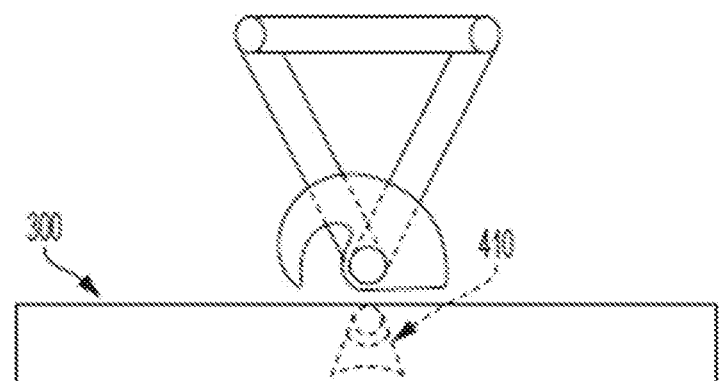
FIG. 3C is an end view of a block diagram of an example mechanical hook used to attach a container to a support truss when the mechanical hook is retracted, according to an embodiment of the invention.

In various embodiments, the mechanical hooks 340 (or other connection components) may be configured to form a support member. For example, the mechanical hooks 340 may be configured to engage and support a freight container from above. In various embodiments, the mechanical hooks 340 may be configured to pivot around and be supported by the bottom chord of support truss 100. In some embodiments, the mechanical hooks 340 may be attached to a rotating bar that, when rotated manually or electrically, situates the mechanical hooks 340 in the predetermined holes, loops, or threads of container(s) 300 (e.g., support loops 410 described further herein). In some embodiments, each hook may be rotated by an electric motor mounted on support truss 100. For example, FIG. 3C shows an end view of a block diagram of mechanical hook 340 when mechanical hook 340 is retracted and/or rotated away from support loop 410, according to an embodiment of the invention. When retracted (i.e., rotated away from the suspended vertical position), the mechanical hooks 340 may be configured so as to not interfere with container 300 loading and unloading. In other words, the shape of mechanical hook 340 may be configured to allow for clearance between it and the top of container 300 when rotated away from support loop 410. In various embodiments, safety latches may be provided to preclude container 300 from being jostled off the hooks 340. In some embodiments, a control system may be configured to require the train to be at rest in a terminal before the safety latches can be released and the hooks 340 rotated. In some embodiments, container connections may be automated and made or released in the terminal while the weight of the container is being supported by its own wheels. In some embodiments, the hooks 340 and support loops may also include wiring connections so the train's electrical grid can supply power to refrigerated containers.

Freight Containers

Figure 4B:
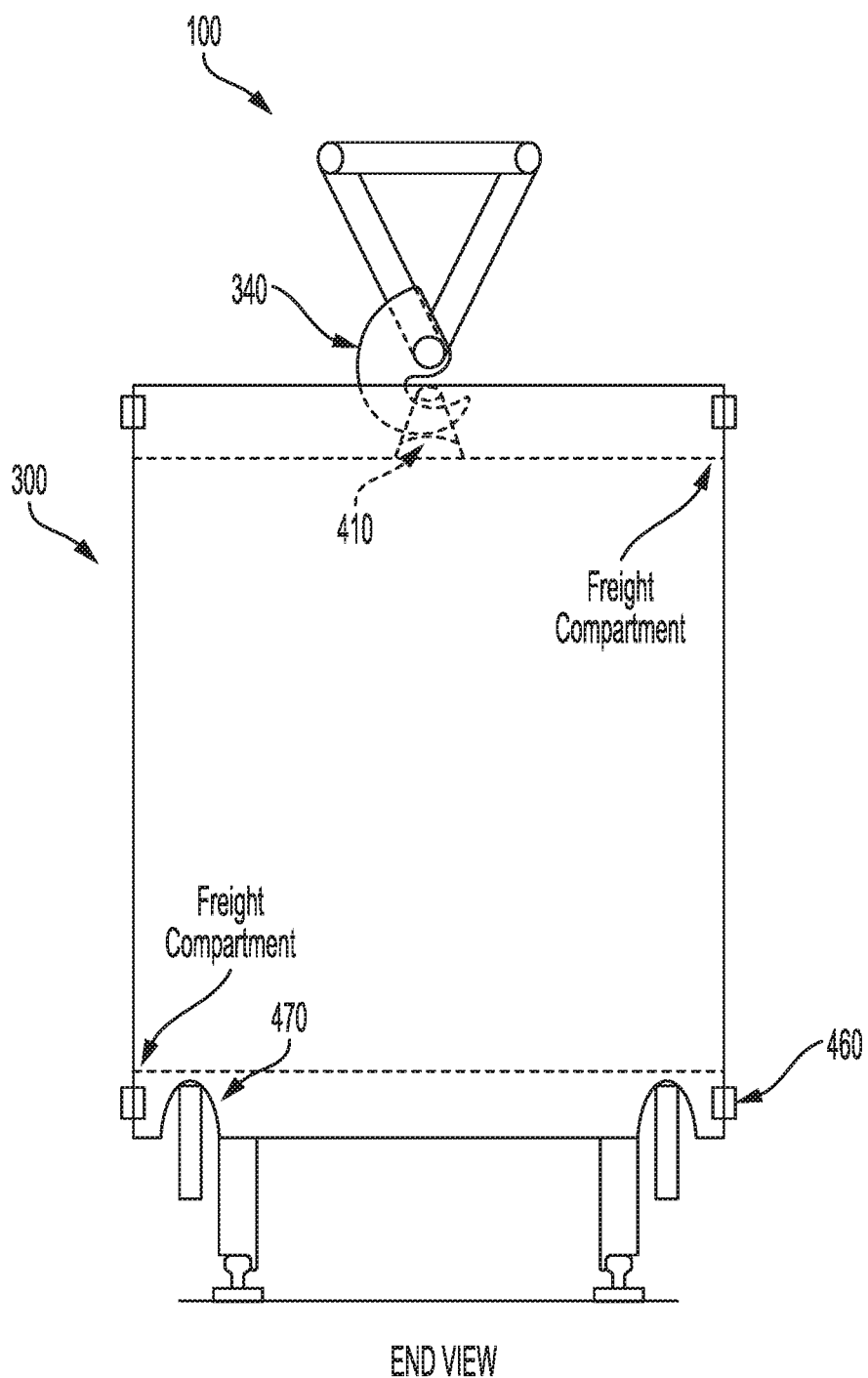
FIG. 4B is an end view of a block diagram of an example freight container attached to a support truss, according to an embodiment of the invention.

In various embodiments, an improved freight container for use with support truss 100 is provided herein. FIG. 4A is a side view of a block diagram of a freight container 300 attached to support truss 100, according to an embodiment of the invention. FIG. 4B is an end view of a block diagram of a freight container 300 attached to support truss 100, according to an embodiment of the invention. In various embodiments, container 300 may include support loops 410, wheels 420, a parapet 430, wheel wells 440, an apron 450, corner bumpers 460, and/or one or more other components. In various embodiments, rollup doors at one or both ends of container 300 may be operable from inside and/or outside. For example, rollup doors at both ends of each container 300 may enable two containers on a flatbed to be loaded and unloaded similar to a semi-trailer. In various embodiments, the exterior dimensions of container 300 and its exterior components may be standardized/uniform. For example, the location and size of wheels 420 of container 300 may be standardized. Uniform exterior dimensions may permit containers 300 to be stacked during storage and/or while on ships. In an example embodiment, each container compartment may be 8'6" high, 8' feet wide, and 20' feet long, and each wheel 420 may have a diameter of 18 inches. In various embodiments, the wheels 420 may extend below the carriage's axles and support beams for proper terminal operations yet provide adequate clearance above the rails and ties to permit its full range of tilting movements.

Wheelsets of individual containers 300 may have a steering mechanism equipped with a retractable drawbar at each end. Regardless of which end is pulled, the front wheels may be configured to steer and the rear wheels will be fixed so several containers can be linked together and pulled like luggage carts at an airport to support efficient terminal operations. In some embodiments, the steering mechanism may also permit sideways movement when both drawbars are retracted so the containers can be pushed in and out of position beneath the trusses when loading and unloading. While attached to a train having an improved design as described herein, all container wheels 420 may be locked into alignment with the rails to facilitate terminal operations. In various embodiments, the container(s) suspended from a support truss 100 may comprise dry van-type containers, bulk tankers, flatbeds, passenger containers, and/or one or more other types of containers. For example, various figures herein depict a dry van-type container but it is easy to imagine one or more other types of containers integrating with the rolling stock components as long as their exterior dimensions, the four connection points, and/or pivoting wheelsets configured to interface with pivoting floor plates described herein are incorporated into their design.

In some embodiments, parapet 430 may conceal wheel wells 440 that align the containers while stacking and/or house the support loops without sacrificing clearance. In some embodiments, the wheel wells 440 and/or the housing for the support loops may be included in the freight compartment. In various embodiments, slots 460 could be cut in apron 450 as depicted in FIG. 4A to facilitate handling by forklifts, provided that handling by forklifts does not impact the steering mechanism. In some embodiments, slots 460 may be configured to interface with rotating hooks installed on flat beds of delivery trucks or trailers. In various embodiments, trucks or trailers may be configured to secure containers via slots 460 while traveling on highways. These connections to containers via slots 460 may comprise connections configured to secure the containers to trucks or trailers in the event of an accident. In some embodiments, truck beds or trailers configured to transport containers described herein may also include pivoting floor plates the same as or similar to the pivoting floor plates of CES's described herein and illustrated in FIG. 5B and FIG. 5C. This would permit loading and unloading from the side or the rear of the truck. In some embodiments, truck beds or trailers configured to transport containers described herein may further include a hydraulic lift configured to raise and/or lower the containers so that apron 450 of the container may rest on the truck bed rather than forcing the container's wheels to support the container during transport. As depicted in FIG. 4B, notches 470 shown in apron 450 in line with the wheels, may improve clearance at grade changes when used with ramps equipped with elevated channels for the wheels. In an example embodiment, the primary application for these specialized ramps for use with container 300 may be with roll-on roll-off (RoRo) shipping activities (which are described further below). In various embodiments, the wheels of freight containers may be configured to lock if a safe load limit is exceeded. For example, a predefined safe load limit may be established based on the maximum load able to be supported by support trusses 100, pivoting floor plates of a CES, and/or other components capabilities. The wheels of containers may be configured to determine when the safe load limit is exceeded and cause the wheels to be locked, prohibiting the containers from moving via the wheels until the safe load limit is no longer exceeded.

Terminal Operations

Figure 5A:
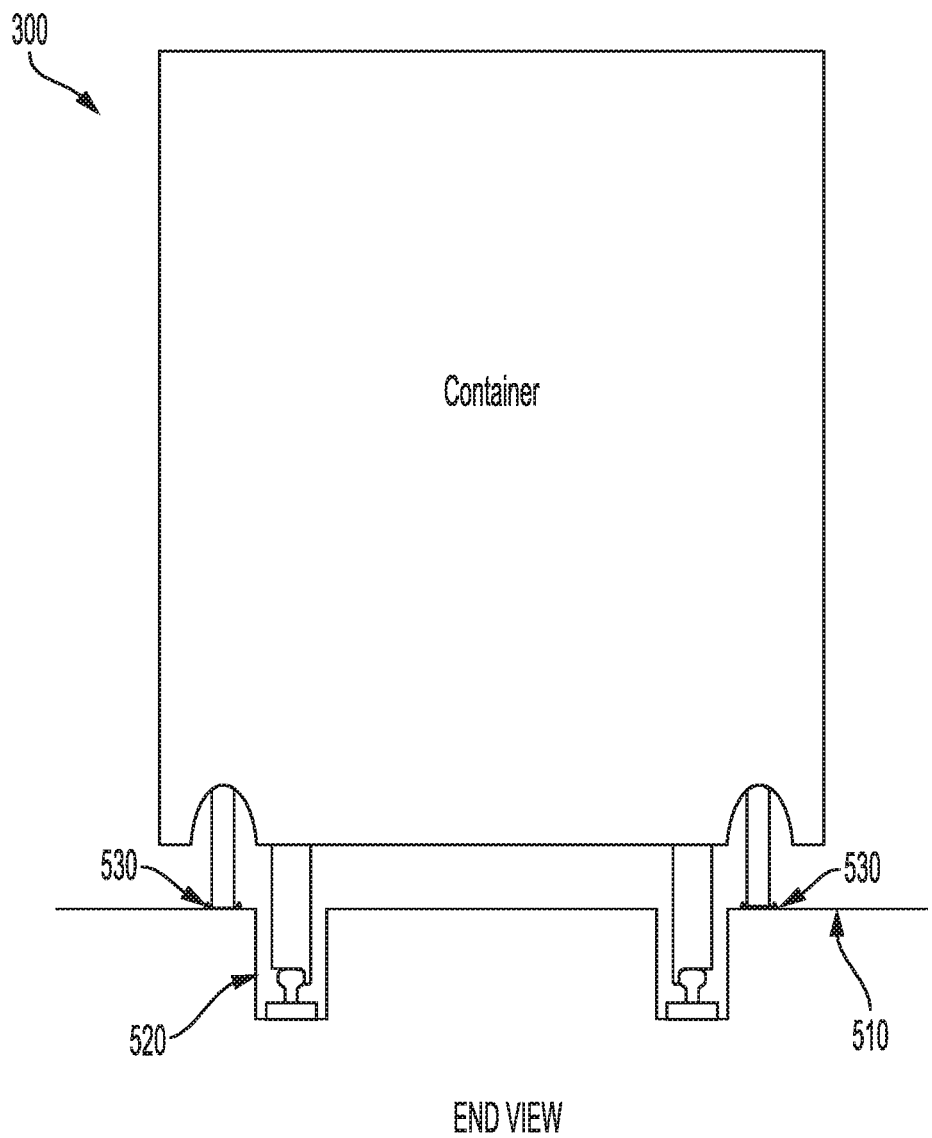
FIG. 5A is an end view of a block diagram of an example container with its wheels in guideways on a terminal's floor, according to an embodiment of the invention.

In various embodiments, an improved container exchange system for use with this improved intermodal transportation system is provided herein. As mentioned earlier, when a train having an improved design as described herein enters a terminal, the floor elevation adjacent to and between the rails may be gradually raised until the containers are supported by their wheels instead of the trusses 100. In various embodiments, the improved container exchange system may include floors configured to rise until the containers are supported by their wheels, container exchange stations (CES) as described herein, and/or one or more other components. For example, FIG. 5A is an end view of a block diagram of a container with its wheels in guideways on a terminal's floor, according to an embodiment of the invention. When a train enters a terminal having the improved container exchange system described herein, floor level 510 may be configured to gradually rise to meet the wheels of container 300. For example, when compared to FIG. 5A, FIG. 4B depicts an end view of a train as if it were traveling on the rails. When the train depicted in FIG. 4B enters a terminal, the floor adjacent to and between the tracks may be gradually raised until the container's wheels are supporting the container (as depicted in FIG. 5A). Notably, in various embodiments, individual containers do not include rail wheels that interface with the rails. For example, rail wheels 480 depicted in FIG. 4B and FIG. 5A comprise rail wheels of the carriage to which a support truss 100 supporting container 300 is connected. In various embodiments, smooth metal channels or guideways (such as container wheel guideways 530) adjacent to the rail slots 520 may be provided to help keep the containers in proper alignment as the train moves through the terminal.

Figure 5B:
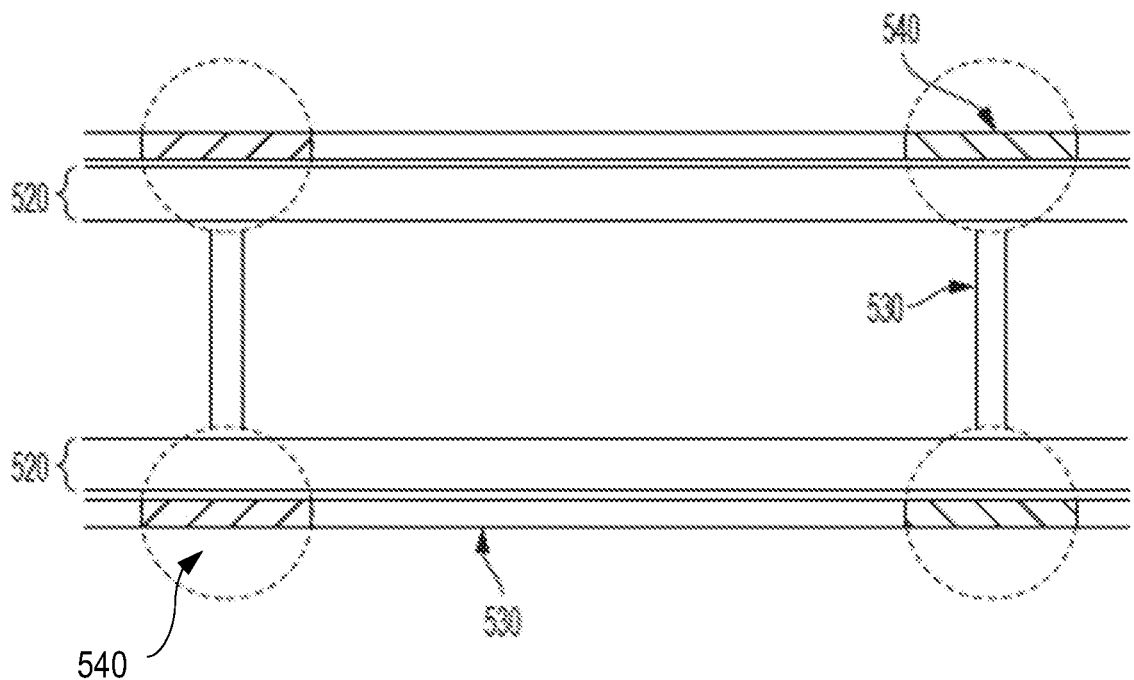
FIG. 5B and FIG. 5C are top views of a block diagram of an example container exchange station, according to an embodiment of the invention.
Figure 5C:
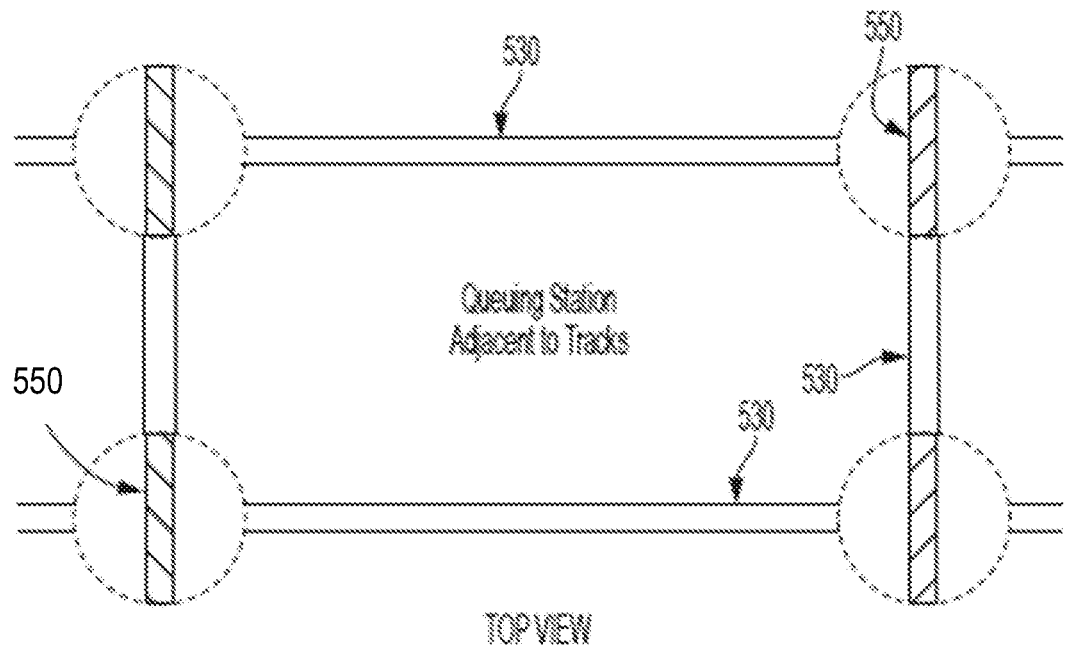

FIG. 5B and FIG. 5C are top views of a block diagram of a container exchange station (CES), according to an embodiment of the invention. In various embodiments, the train may be stopped when the container(s) scheduled for off-loading are positioned over the correct CES. Control of the trains while in the terminal may be shifted to a routing computer to assure that the correct container is properly aligned with the appropriate CES. Once properly aligned, the arriving container may be disconnected from the train and the wheels of the container are rotated 90 degrees by the CES's pivoting floor plates, which also serve to bridge the rail slots 520 along container wheel guideways 530. Container attachments should be easy to disconnect and connect because the weight of the containers is supported by the containers' wheels. In some embodiments, the connections between the trusses and the couplers/carriages that support them and/or the connections between the control cars and their adjacent carriages may be configured so that they do not need to be disconnected when containers and/or power cells are exchanged at terminals. In other words, it may not be required to disassemble the train as is done with conventional railroad equipment at classification yards to redirect container loads to the various destinations within the network. In some implementations, the sorting of the containers by destination may be done at the terminals between train arrivals without employing any of the rolling stock components in this activity. As used herein, the term "rolling stock" may refer to the components of the improved train described herein (i.e., the support trusses 100, carriages with integrated pivoting coupler assemblies, and control cars) less the components suspended from the support trusses 100 (i.e., freight containers and/or power supplies). In some implementations, the terminals and each CES may use robotic arms and/or other means to fully automate the process of exchanging containers and power cells to increase terminal efficiency, minimize train dwell times, and reduce the potential for employee injuries, while also allowing the freight to keep moving and improve the utilization of the system's investment in rolling stock components. To illustrate the two positions of the pivoting floor plates, FIG. 5B includes pivoting floor plates 540 situated (or rotated into) a position parallel to the rails, and FIG. 5C includes pivoting floor plates 550 situated (or rotated into) a position perpendicular to the rails. In other words, pivoting floor plates 550 merely comprise the pivoting floor plates 540 pivoted 90 degrees. When the train is moving down the tracks within the station, the pivoting floor plates may be situated as depicted in FIG. 5B (i.e., pivoting floor plates 540). When the containers are being moved in and out of position under support truss 100, the pivoting floor plates may be situated as depicted in FIG. 5C (i.e., pivoting floor plates 550). In some embodiments, all pivoting floor plates may be configured to move in unison.

When the containers are properly aligned and disconnected from the train, a robotic arm may be configured to push each arriving container off to the side while simultaneously moving a departing container into position under the truss from an adjacent queuing station. The pivoting floor plates 550 may then pivot back to the plates' original position (i.e., the position depicted in connection with pivoting floor plates 540), the container hook and bottom chord connections are made, and the train departs or moves forward to exchange the next series of containers. In some implementations, crew changes and swapping in generators with full tanks or recharged batteries may be done at the same time to minimize terminal delays and keep the freight moving. In some implementations, crew changes may be arranged so a shift is out on one train and back on another so the cost of overnight stays is eliminated and job satisfaction improves.

In various embodiments, the CES units may be arranged in adjacent pairs with a carriage space between them. In some embodiments, the number installed at each terminal may vary with freight volume. For example, high volume terminals might have a dozen or more pairs, each with several adjacent queuing stations, so large segments of a train can be serviced before repositioning it, and the departing containers for several exchange operations can all be prepositioned between train arrivals. In various embodiments, routing software may group containers by destination to minimize the number of times a train should be repositioned at each stop.

At high volume terminals and those where multiple routes converge, it may be more efficient to divide a train into two segments and replace one of them in a single step rather than exchanging groups of containers. In this operation, the containers under the truss where a train is to be split may be off-loaded and a movable overhead crane may lift and support the truss. Since each segment may include a control car, train segments (e.g., a control car and zero or more carriages) can move independently and once separated, a departing segment can be moved in from an adjacent siding and connected in a similar, but reverse manner, creating a new train where all onboard containers have destinations along the same route. Containers destined for the different routes served by the terminal may have already been sorted to the correct side of this break-point either at the terminal or prior to arrival.

In various embodiments, these larger terminals may also be equipped with automated train assembly stations so that train segments destined for different routes can be assembled from spare components located on site. Support trusses may be stocked in overhead racks, so the carriages can be stored in a more compressed fashion, and then lowered onto prepositioned carriages as containers are gathered for the various routes. In some embodiments, an improved intermodal system may maintain an inventory of spare components that may flow back and forth throughout the system's collection of terminals. A train segment that arrives with containers destined for multiple routes might be completely disassembled and used to restore a working inventory of components to the terminal's train assembly stations. Managing the location of these spare components and minimizing the number of empty containers that are moved may be carefully monitored by management with an eye toward maintaining the ability to respond quickly to seasonal demand fluctuations. In some embodiments, these more complex terminals could also house maintenance facilities since these terminals may be able to rotate individual components in and out of service for repairs, cleaning, and inspections.

Carriage and Pivoting Coupler Assembly

In various embodiments, a carriage and its pivoting coupler assembly (PCA) described herein may form a single component comprising two separate but integrated subassemblies that interact in a way that isolates the containers from rail bed shocks and vibrations while keeping the containers' center of gravity between the rails, even while cornering at speed. The PCA is comprised of the coupler at the top of the assembly that may slide from side to side while resting on a support ring—a component of the carriage's structure. On the front and back of the coupler are side plates that extend below the sides of the support ring to a pin located just inside the support ring that may attach a framework hanging from the coupler that may support a flywheel and extend to a swinging arm located just above the carriage's axles. This framework may also connect to pivot braces installed on the front and back of the carriage between its parallel rings to further secure the PCA to the carriage's structure while allowing it to pivot around pivot points in the braces, which may comprise the central axis of the support ring.

Figure 6A:
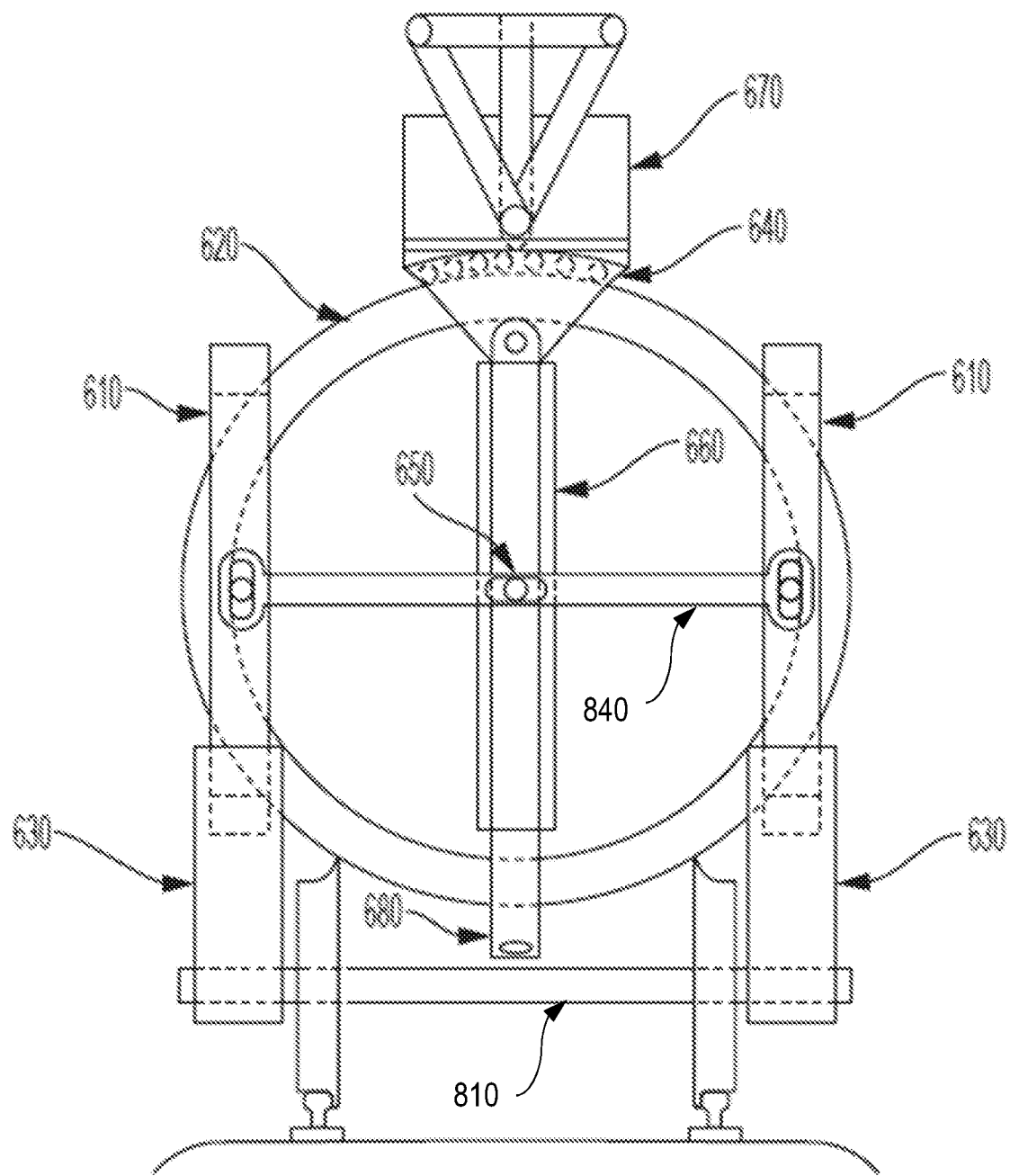
FIG. 6A is an end view of a block diagram of an example carriage and pivoting coupler assembly, according to an embodiment of the invention.
Figure 6B:
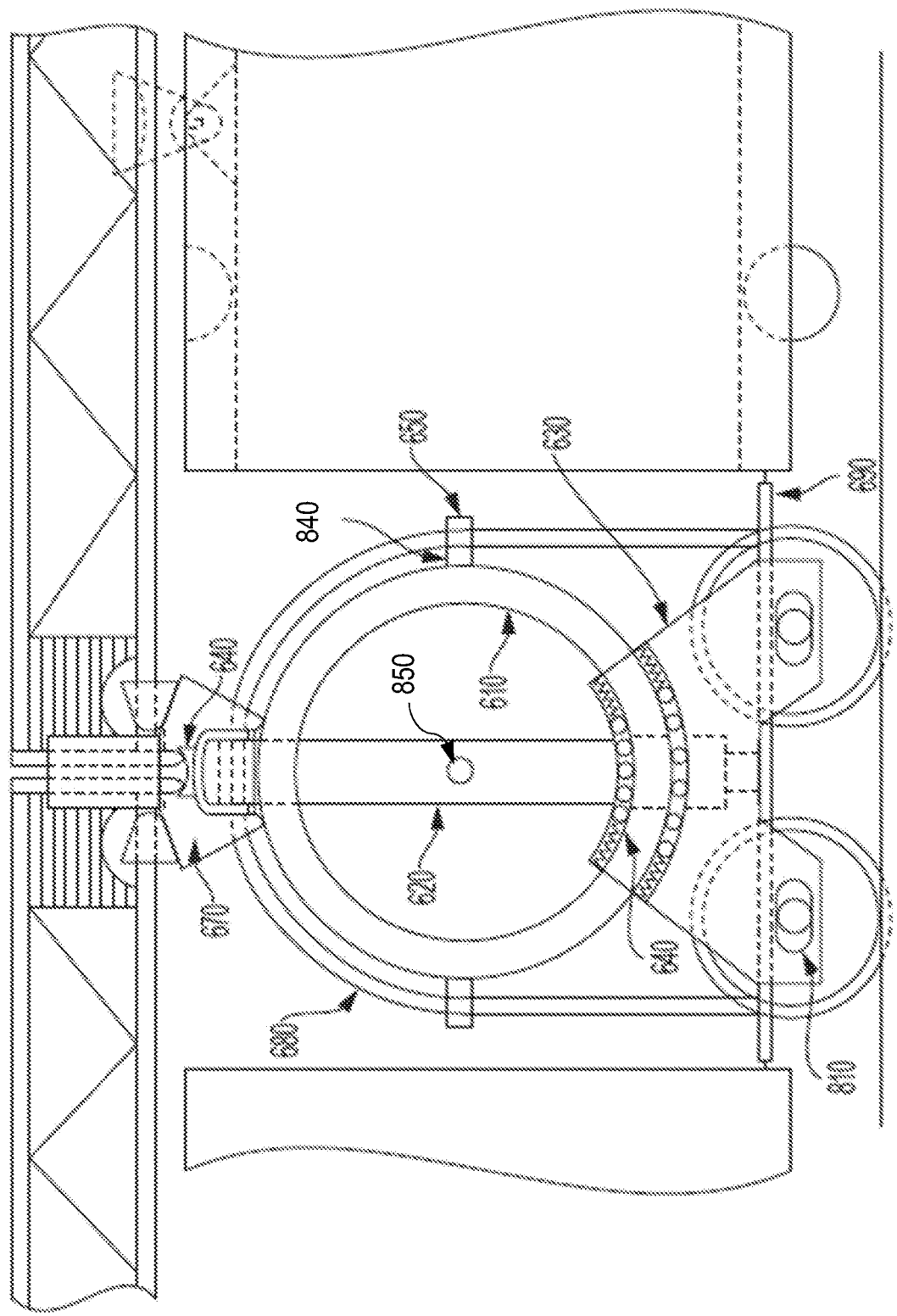
FIG. 6B is a side view of a block diagram of an example carriage and pivoting coupler assembly, according to an embodiment of the invention.

In various embodiments, an improved intermodal carriage may be configured to house the drive mechanism and transfer the loads from the support trusses and couplers at the top of the assembly down to the axles and rails. FIG. 6A is an end view of a block diagram of a carriage and pivoting coupler assembly, according to an embodiment of the invention. FIG. 6B is a side view of a block diagram of a carriage and a portion of the pivoting coupler assembly, according to an embodiment of the invention. In FIG. 6B, the carriage is depicted without at least horizontal brace 860 and flywheel 660 in order to illustrate a portion of the pivoting coupler assembly. For example, FIG. 6A and FIG. 6B show the three-ring structural design of the carriage with its pivot brace and enough of the PCA to appreciate how the three-ring structure of the carriage is integrated with the PCA. In FIGS. 8A-D (described further herein), the PCA is illustrated with enough of the carriage structure to appreciate how the PCA is integrated with the three-ring structure of the carriage.

In various embodiments, a carriage may comprise two or more parallel rings (e.g., parallel rings 610), one or more support rings (e.g., support ring 620), and/or one or more other components. These rings may comprise large steel rings that form the structural framework of a carriage. In various embodiments, parallel rings 610 may be parallel to the rails, and support ring 620 may be positioned perpendicular to and centered between the parallel rings 610. In various embodiments, parallel rings 610 may provide support for support ring 620, which is carrying the coupler and the loads attached to it.

In various embodiments, parallel rings 610 may rest on support beams 630 that connect to and are supported by the carriage axles. In various embodiments, support beams 630 may be designed with an inverted arch of slightly larger radius than the parallel rings 610. In other words, parallel rings 610 may rest on support beams 630 connected at the carriage's axles, within an arch-shaped inverted housing with a radius that is slightly larger than the rings. FIG. 6B includes a cut-away view of support beam 630, revealing roller bearings 632 and opposing springs 634. In various embodiments, a series of roller bearings 632, Teflon glides, and/or other similar low friction components (similar to roller bearings 640 described further herein) may form the interface between the parallel rings 610 and these arched beams 630, allowing the beams to pivot beneath the rings as the carriage's wheels roll over dips in the rails while still providing uniform support.

In some embodiments, opposing springs 634 may cushion the pivoting movement and draw the parallel rings 610 back to their resting position to maintain the vertical position of support ring 620 when the carriage is not linked to a train. In some embodiments, the outside edge of parallel rings 610 may be enclosed within the support beams 630 while the inside edge remains partially open to attach support ring 620 and accommodate its limited range of movement. In some embodiments, support beams 630 may also accommodate slight sideways movements in parallel rings 610 since track conditions may cause the intersecting planes of support ring 620 and parallel rings 610 to deviate from 90 degrees, drawing parallel rings 610 closer together.

In various embodiments, the two parallel rings 610 and support ring 620 are connected at points where the rings intersect with one another, forming a rigid frame along the vertical and horizontal axes. In various embodiments, these connections may pivot around the vertical axis to permit the rings to deviate slightly from a 90-degree angle at the points where the rings intersect. In other words, these connections may pivot around the vertical axis since track conditions may cause the parallel rings 610 to move in opposite directions from one another. In various embodiments, these pivot points may include springs or other similar electrical or mechanical mechanism permitting torsion and/or deflection, to return the intersecting rings to a perpendicular relationship after flexing.

In an example embodiment, the carriage and truss assembly shown is approximately 9' wide, 8'6" long, and 15' high—well within the loading gauge (i.e., the maximum height and width for railway vehicles and their loads to ensure that they can pass safely through tunnels, under bridges and keep clear of trackside buildings and structures). In such an embodiment, the load may tilt up to 22-23 degrees while lowering the coupler only 5-6 inches. If improved leverage is needed to shift the coupler, the pivoting coupler assembly could be extended below the carriage axles, restricting the maximum tilt angle to 17-18 degrees. In various embodiments, the carriage axles may move within horizontal slots in the support beams to accommodate the carriage steering mechanism described herein with respect to FIGS. 10A, 10B and 10C.

Figure 7A:
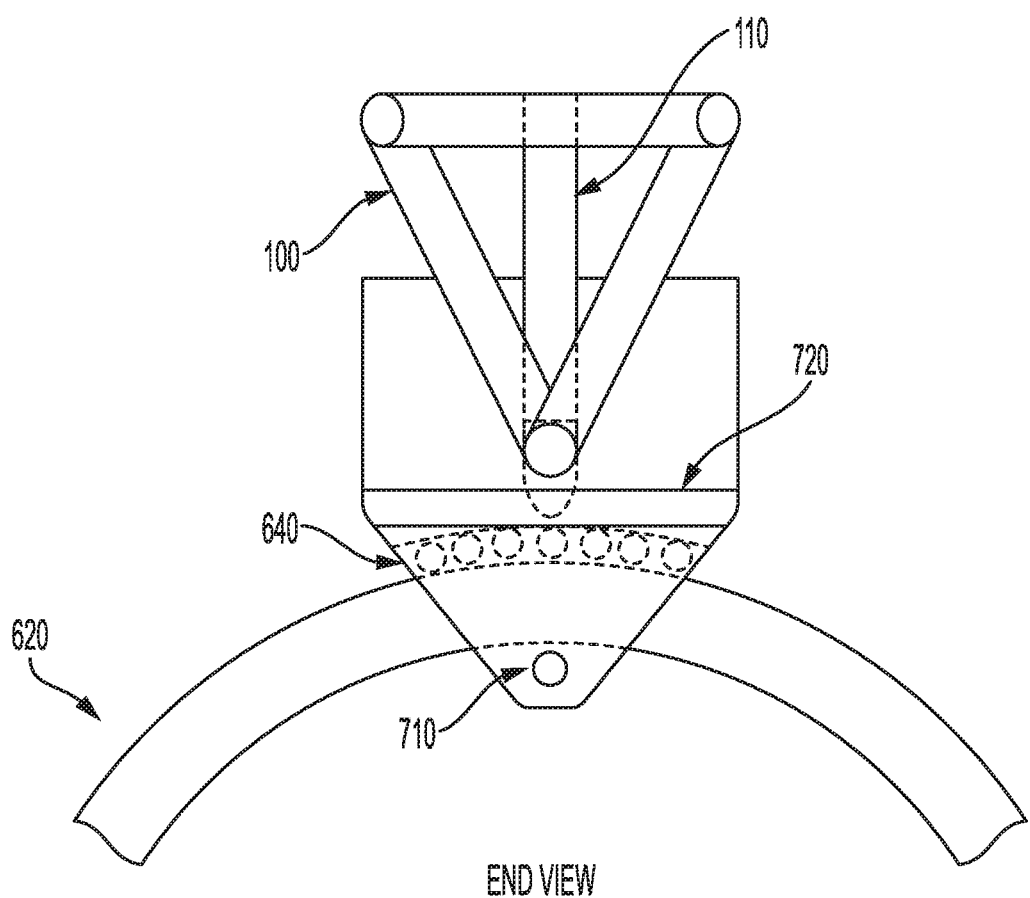
FIG. 7A is an end view of a block diagram of an example coupler, according to an embodiment of the invention.
Figure 7B:
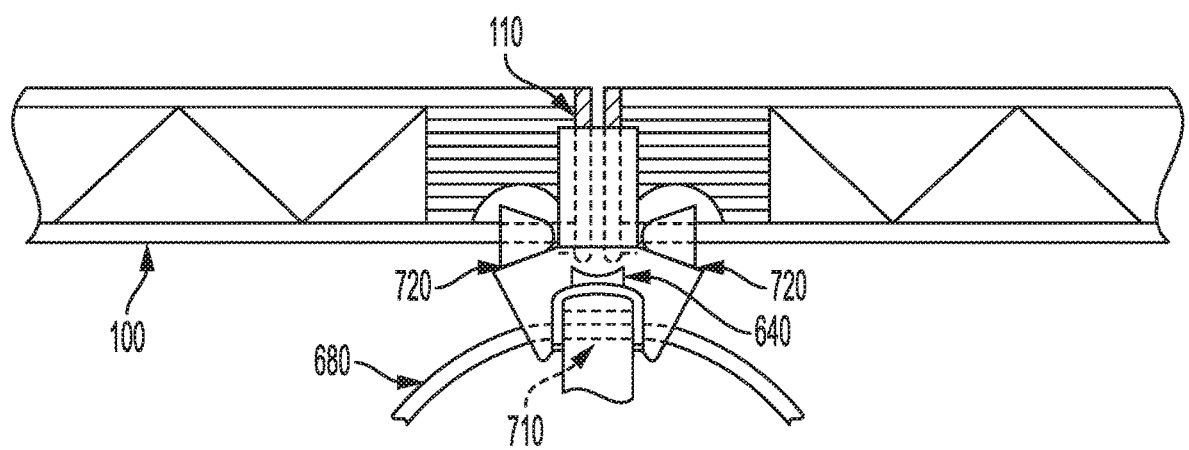
FIG. 7B is a side view of a block diagram of an example coupler showing a portion of its attachment to the pivoting coupler assembly's framework, according to an embodiment of the invention.
Figure 7C:
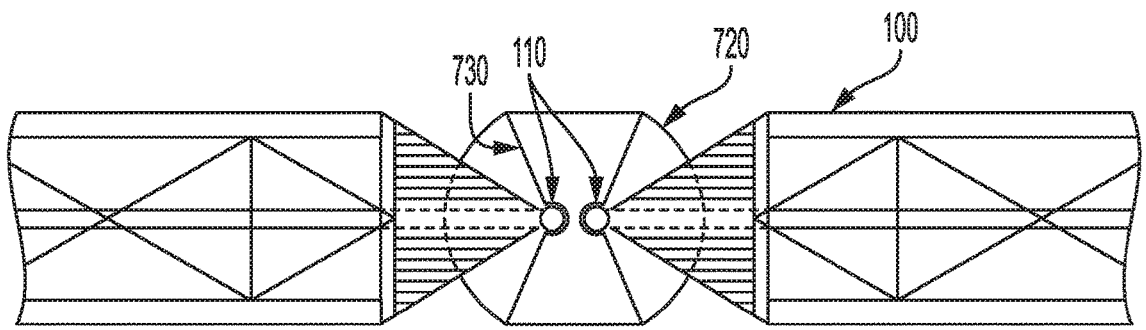
FIG. 7C is a top view of a block diagram of an example coupler, according to an embodiment of the invention.

In various embodiments, the pivoting coupler assembly may include a flywheel 660, a coupler 670, a framework to support the flywheel and connect to the carriage's structure 680, and a bottom chord connection 690. In various embodiments, the coupler 670 rests on top of the support ring 620 of the carriage and uses a series of roller bearings 640 or low friction glides (similar to the bearing design described above with respect to roller bearings 632 that form an interface between the parallel rings 610 and the arched support beams 630). For example, the underside of coupler 670 may be curved and equipped with roller bearings 640 or glides that allow it to move from side to side on support ring 620. For example, FIG. 7A shows an end view of a block diagram of a coupler, FIG. 7B shows a side view of a block diagram of a portion of a coupler's attachment to a pivoting coupler assembly's framework, and FIG. 7C shows a top view of a block diagram of a coupler, according to one or more embodiments of the invention. As described earlier with respect to FIGS. 1A, 1B, and 1C, connecting pins 110 welded to support truss 100 may be lowered into slotted cylinders of the coupler that allow the support trusses 100 to swivel without permitting the support trusses 100 to rotate about their horizontal axis.

As depicted in FIGS. 7A, 7B, and 7C, the carriage and pivoting coupler assembly (PCA) may include concave roller bearings 640 or similarly shaped glides (as described above with respect to FIG. 6A and FIG. 6B), a pin 710 supporting the framework of the PCA, support plates 720, and/or one or more other components. In various embodiments, the convex shape of the top arch of support ring 620 interfacing with concave roller bearings 640 or glides will allow support ring 620 to tilt slightly from vertical as the parallel rings 610 and support ring 620 interfaces react to track conditions. In various embodiments, the degree of tilt permitted in support ring 620 may be strictly limited by the coupler's side plates 720 acting at the top of the ring and the center vertical shaft of the PCA framework passing through a slot in the bottom of the ring. The couplers and their attached trusses working with the springs and/or tensioning devices included in the bottom chord connectors shown in FIG. 9 may continuously draw support ring 620 back to a vertical position after any flexing caused by track conditions. FIG. 7A includes a cut-away view of the coupler and support ring 620 and shows an example location of roller bearings 640. In various embodiments, vertical walls 730 extending from the slotted vertical cylinders 740 are angled to provide support plates 720 with adequate room to accommodate the full range of anticipated truss pivoting. In some embodiments, support plates 720—on which the support truss 100 rests—have a slight conical shape to interface with the cone-shaped bearing that will wrap the bottom chord of the truss adjacent to the connecting pins, as depicted in FIG. 1A. In some embodiments, the coupler design may include a hinge point between two adjacent trusses so they can deviate from a straight line when the train encounters a change in grade.

Figure 8A:
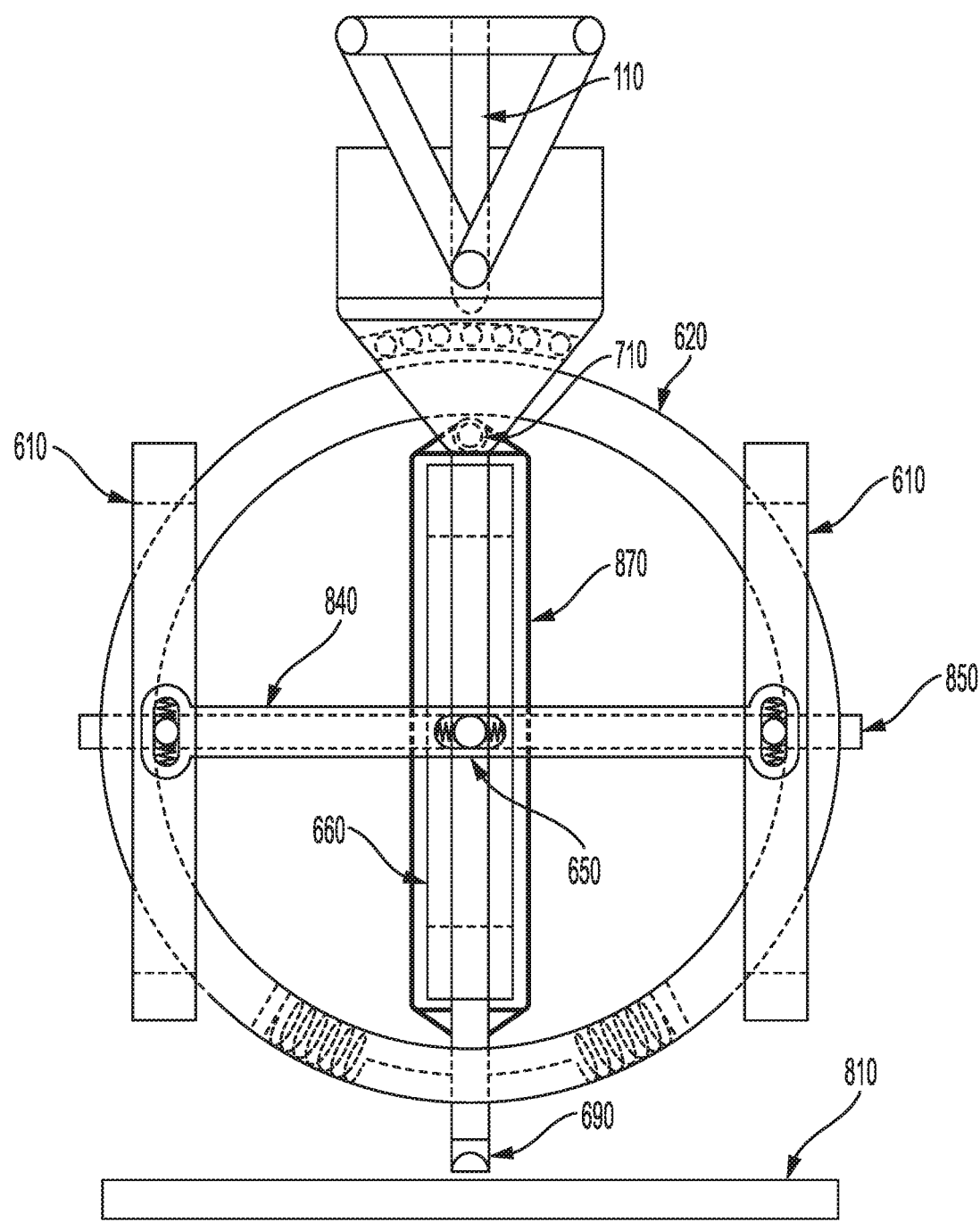
FIG. 8A is an end view of a block diagram of an example pivoting coupler assembly and how it interfaces with the three-ring structure and pivot braces contained in each carriage, according to an embodiment of the invention.
Figure 8B:
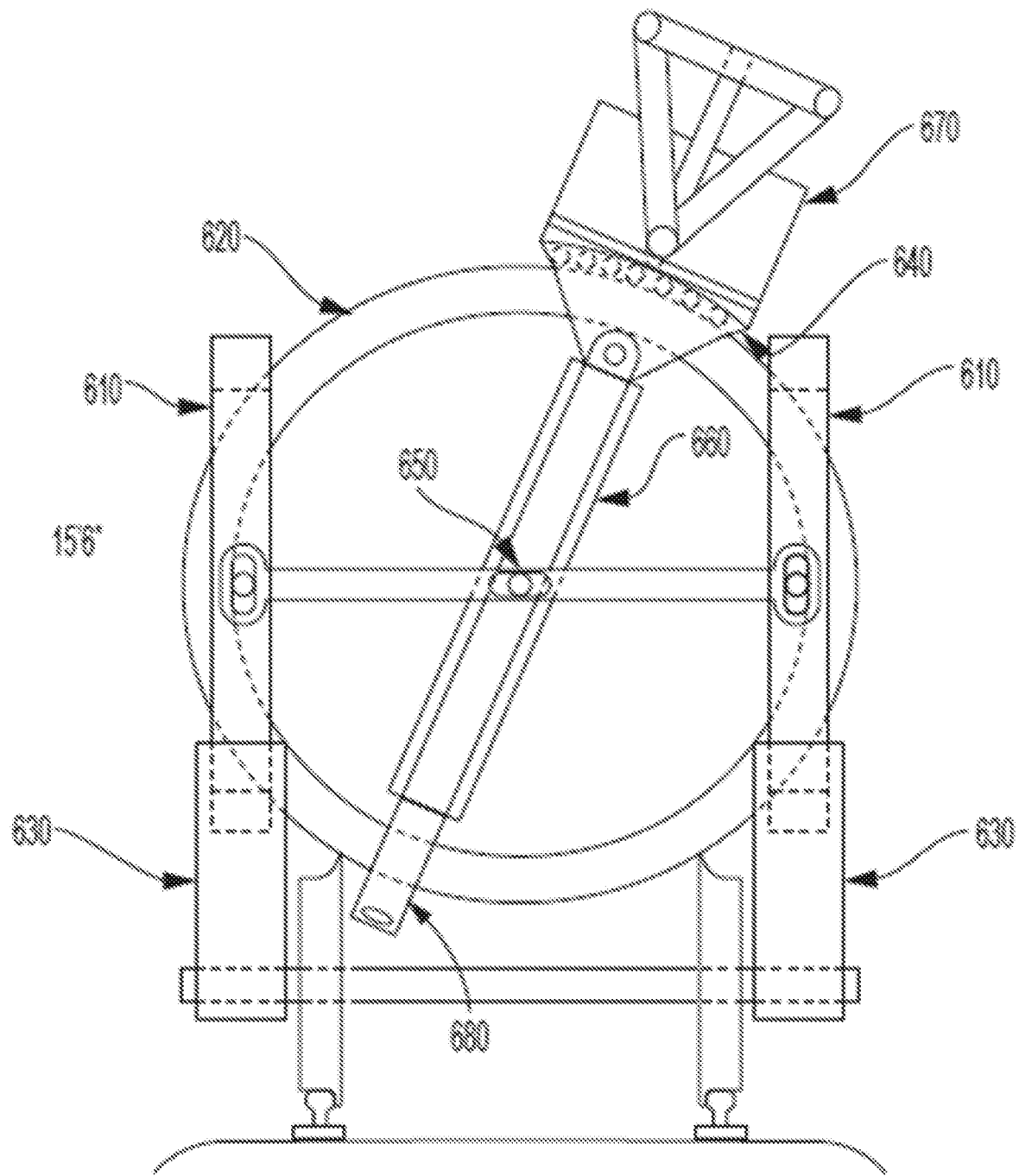
FIG. 8B is an end view of a block diagram of an example carriage and pivoting coupler assembly during cornering, according to an embodiment of the invention.
Figure 8C:
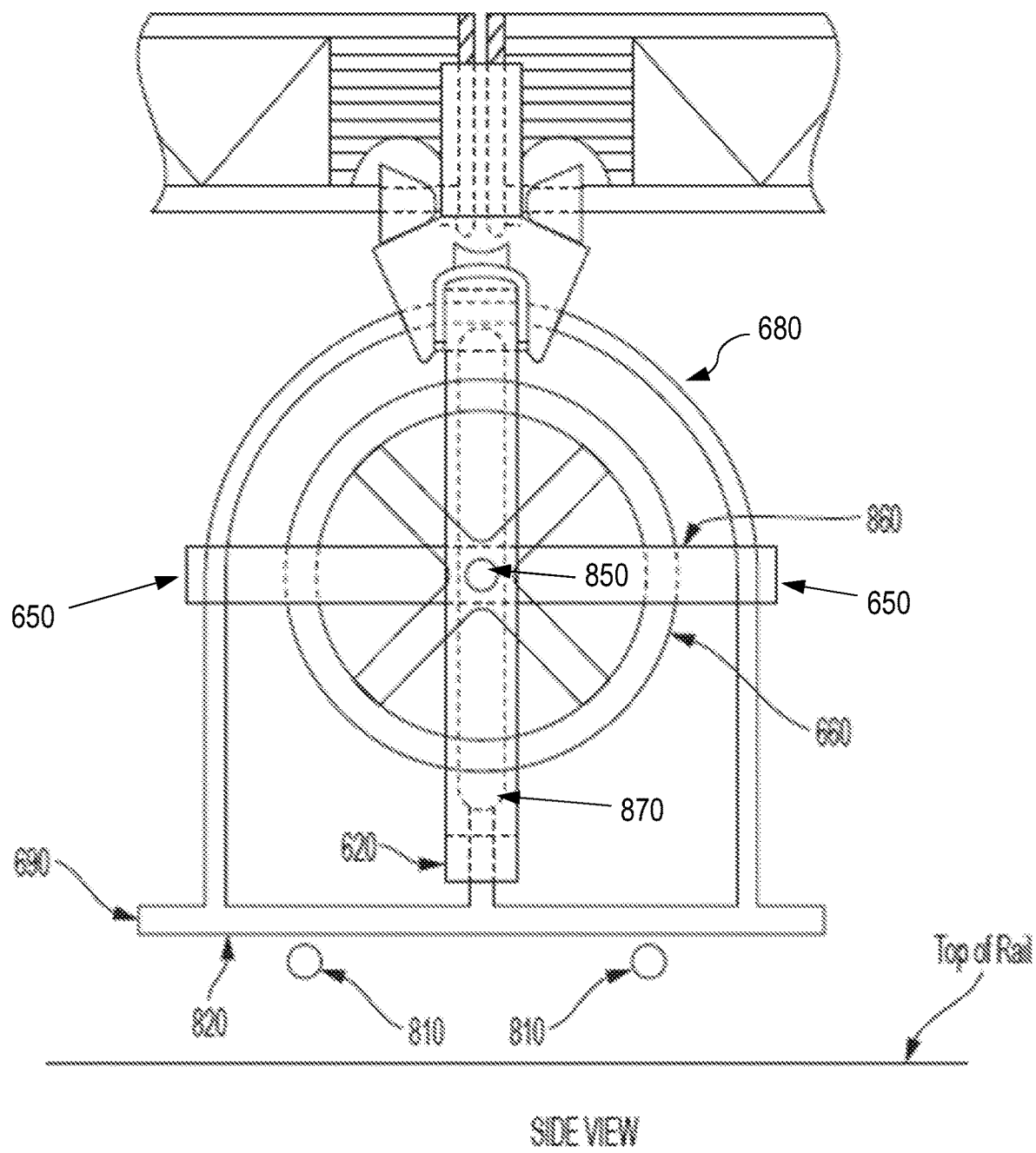
FIG. 8C is a side view of a block diagram of an example pivoting coupler assembly, according to an embodiment of the invention.
Figure 8D:
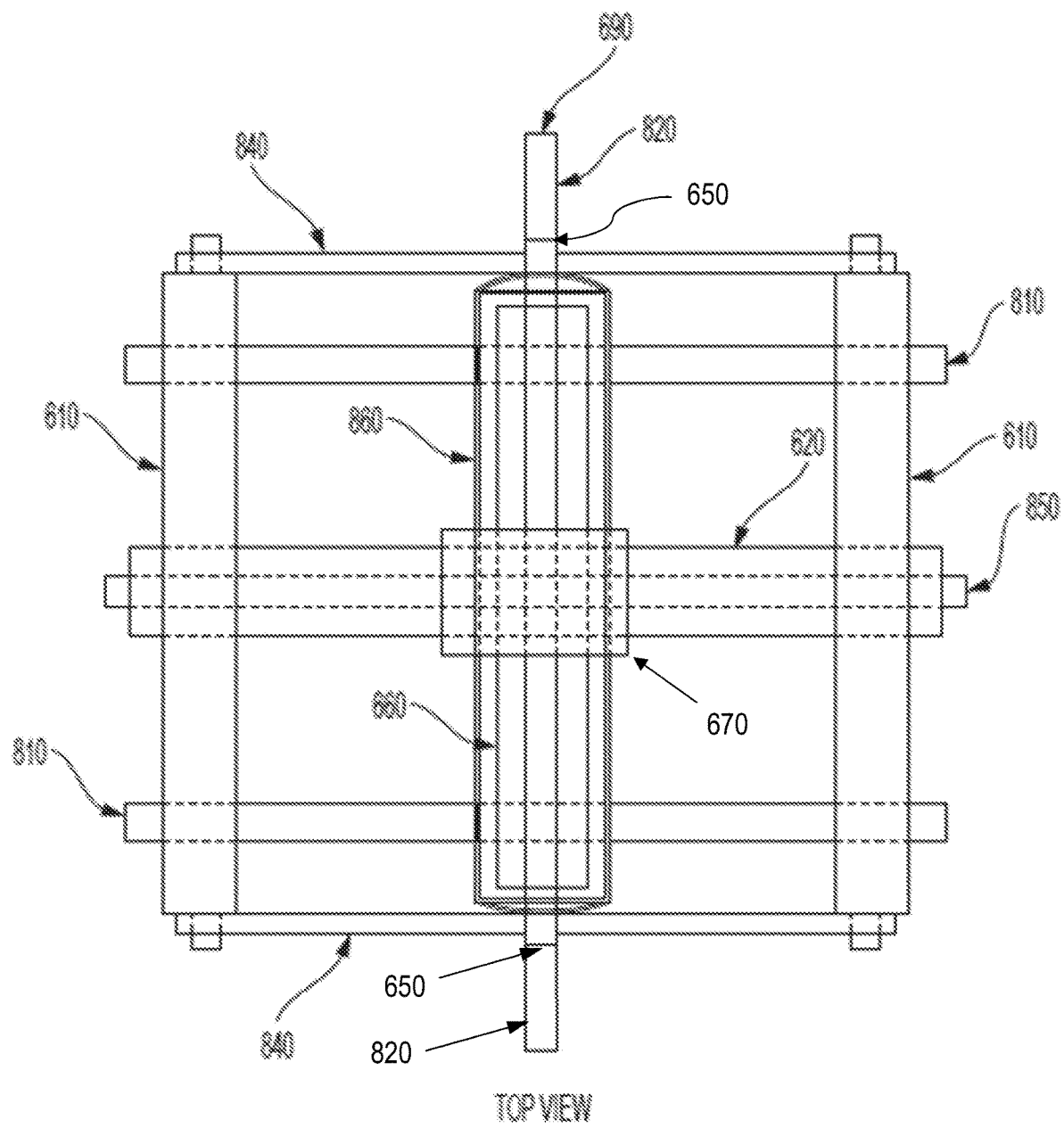
FIG. 8D is a top view of a block diagram of an example pivoting coupler assembly and how it interfaces with the three-ring structure and pivot braces contained in each carriage, according to an embodiment of the invention.

In various embodiments, the PCA framework may extend down from the coupler to just above carriage axles 810, where a swinging arm 820 runs the length of the carriage and attaches to the adjacent containers. For example, FIG. 8A shows an end view of a block diagram of an example pivoting coupler assembly and how it interfaces with the three-ring structure and pivot braces contained in each carriage, FIG. 8B shows an end view of a block diagram of an example carriage and pivoting coupler assembly during cornering (as discussed further below in connection with FIG. 9); FIG. 8C shows a side view of a block diagram of an example pivoting coupler assembly, and FIG. 8D shows a top view of a block diagram of an example pivoting coupler assembly and how it interfaces with the three-ring structure and pivot braces contained in each carriage, according to one or more embodiments of the invention. For simplicity, the carriage wheels and arched beams are not depicted, and the carriage axles 810 are shown for reference. In various embodiments, this pivoting coupler assembly may also support a flywheel 660 configured to pivot around the central axis of support ring 620. When all adjacent containers are connected to one another and the swinging arms 820 at the bottom of the coupler assemblies (for example, as depicted as position 320 and position 330 of container(s) 300 in FIG. 3A), the train has a second longitudinal connection at the train's bottom chord that works in conjunction with the trusses and the parallel ring/support beam interfaces to maintain the vertical position of the support rings 620 within small tolerances.

In various embodiments, the PCA framework may hang from a pin 710 (depicted in FIG. 7A and FIG. 7B) that is connected to the coupler on the inside of support ring 620. The PCA framework may support flywheel 660 and extend downward with three vertical members—i.e., the two vertical members on the front and back of the carriage and the center one fitting through a slot in the bottom of the support ring 620—that attach to swinging arm 820 of the pivoting coupler assembly (which are also depicted as the framework 680 configured to support the flywheel and connect to the carriage's structure). In various embodiments, the PCA includes a flywheel drive shaft 850, a horizontal flywheel brace 860 that extends to pivot point 650 in pivot brace 840 at both the front and back of the carriage, a vertical flywheel support 870 that is pinned via pin 710 to the underside of the coupler and extends down to the swinging arm 820 at the bottom of the framework in three locations (two of which connect with pivot point 650 and the third dropping down from pin 710 to support the flywheel by its drive shaft and then through a slot at the bottom of support ring 620), and/or one or more other components.

In various embodiments, flywheel 660 and its mass may be situated in the center of the carriage to have a stabilizing effect on its operation. In various embodiments, flywheel 660 may collect and store potential energy when braking, and may play a role in applying motive power within its carriage (e.g., engage/disengage the carriage's motive power as needed). In some embodiments, an electric motor may be coupled to flywheel 660 via a transmission and may spin the flywheel using energy the transmission and/or motors draw from the train's power grid. In some embodiments, the transmissions may disengage when coasting and store energy in the flywheel(s) 660 when braking.

In various embodiments, the rotation of the pivoting coupler assembly must be cushioned to prevent the lower end from hitting the inside of the carriage wheels while cornering. This could be done, for example, with a cable and spring device 880 inside support ring 620, attached to both sides of the coupler and to the central vertical member of the PCA framework as it passes through the slot in support ring 620.

The interaction of the pivoting coupler assembly (PCA) with the unique three-ring structural design of the carriage may provide one or more operational advantages. For example, this interaction may improve suspension and ride characteristics for the freight. In various embodiments, the geometry of the three-ring structure with gliding interfaces between companion arches along all three of the axes that can impact the load may help isolate the freight from rail bed shocks. If a carriage wheel rolls over a dip, support beam 630 of the carriage simply pivots beneath parallel ring 610. Any vertical movement of one axle relative to the other will be halved at the center of support beam 630 connecting them and halved again at the center of support ring 620 beneath the coupler. The centrifugal force generated by the spinning flywheel 660 will cushion and delay any reaction by the coupler and the distance of the container hooks 340 from the coupler and the ability of the container's support loops 410 to rotate on hooks 340 will further isolate the loads. In effect, various components (e.g., control car, PCA, carriages) of this train may act as part of an amalgamated suspension system for the train. The couplers and support trusses should remain almost stationary while the carriage's ring interfaces allow the carriage wheels to move independently beneath them while still providing smooth, even support. This configuration, bearing some resemblance to a gyroscope with flywheel 660 situated at the center of the rings, provides several locations where the impact of a jolt at a carriage axle is stepped down as it moves toward the freight containers.

The pivoting coupler assembly may also improve cornering. In various embodiments, pivot point 650 in the PCA framework is closer to the top so the weight of the containers will keep it vertical, centering the coupler and its loads between the rails when on straight track. When cornering, centrifugal force and momentum will cause the containers to swing outward, pushing the swinging arm at the bottom of the PCA framework toward the outside of the curve while pivoting the coupler in the opposite direction. For example, FIG. 8B shows an end view of a block diagram of an example carriage and pivoting coupler assembly during cornering, according to an embodiment of the invention. As a train comprising support truss 100 and both the carriage and pivoting coupler assembly (PCA) described herein enters a curve, the mass of the containers will cause the containers to swing outward at the bottom chord of the train. Because the bottom of the containers are connected to the carriage via swinging arm 820 of the pivoting coupler assembly, the containers swinging outward at the bottom chord of the train will cause the swinging arm assembly to swing outward, thereby causing coupler 670—which is resting on top of support ring 620 of the carriage and uses a series of roller bearings 640 or low friction glides—to move toward the inside of the curve, as depicted in FIG. 8B. This will shift more of the weight to the inside wheels and move the linear integrity of the truss/coupler spine toward the inside of the curve where the truss/coupler spine's inability to stretch will resist the train's tendency to tip outward.

This same pivoting motion will force the bottom chord of the train to stretch as it moves away from the center of the curve since the top chord cannot be compressed, so a degree of longitudinal flexibility may be provided in the bottom chord connection 690 where the containers attach to the swinging arm 820 of the pivoting coupler assembly. This longitudinal flexibility may also permit the carriages to shift slightly beneath the carriage loads (e.g., containers) as the carriages accelerate or decelerate and as the carriages encounter bumps in the track since vertical movements at either end of the curved beams will force the parallel rings 610 that the beams support to move both vertically and horizontally.

Figure 9:
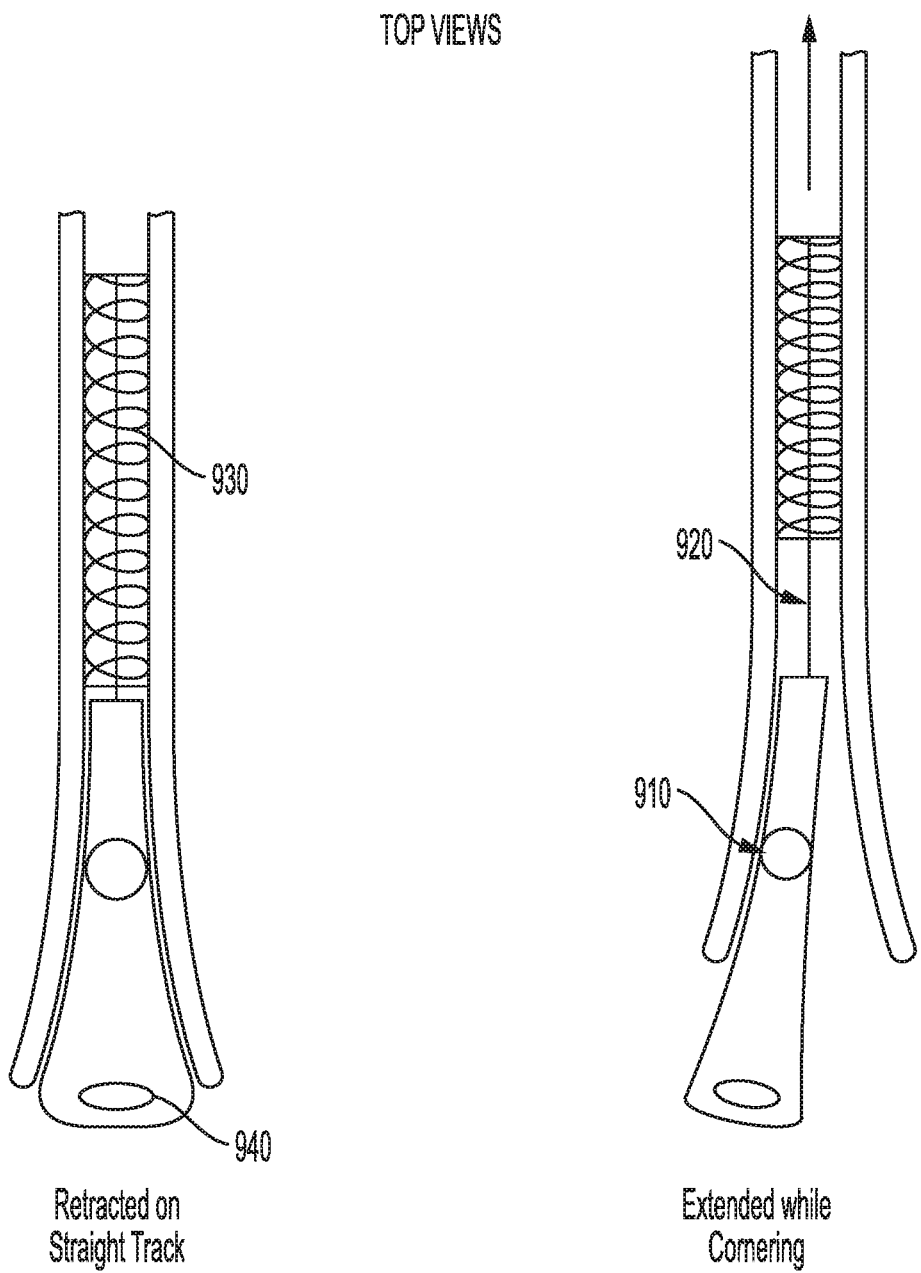
FIG. 9 is a top view of a block diagram of an example bottom chord connector both when extended while cornering and when retracted on a straight track, according to an embodiment of the invention.

For example, FIG. 9 provides a top view of a block diagram of an example bottom chord connector both when extended while cornering and when retracted on a straight track, according to an embodiment of the invention. Located at both ends of the swinging arm 820 of the pivoting coupler assembly, the bottom chord connectors attach to the bottom of adjacent containers at their centerline. The locations of these connection points are shown in FIG. 3A (position 320 of container(s) 300). In various embodiments, the bottom chord connector may include a hinge point 910, cable 920, one or more springs 930, an oblong hole 940, and/or one or more other components. In various embodiments, the bottom chord connector may be configured to stretch yet still exert sideways pressure on the swinging arm 820 of the pivoting coupler assembly while cornering. In some embodiments, oblong hole 940 may be configured to provide some sideways play to compensate for unevenly loaded containers and may work with the slotted pivot brace 840 installed on the front and back of the carriage between parallel rings 610 and shown in FIG. 6A, FIG. 8A, and FIG. 8D to provide a measure of flexibility or shock absorption before causing the coupler to react. When retracted, the sideways freedom of movement for the containers may be limited, but when extended during cornering, hinge point 910 and the expanded housing may provide a greater independence of movement. In various embodiments, spring(s) 930 may tend to draw the containers back into alignment with the centerline of the tracks, when not cornering. The amount of tension in these springs and others deployed in the carriage design may be adjustable to provide a ride adjustment mechanism in response to the varying weights of heavily loaded versus empty containers. In various embodiments, as the carriage encounters depressions in the track, the interaction of parallel rings 610 and curved support beams 630 may cause support ring 620 to deviate slightly from vertical. The spring(s) 930 in the bottom chord connectors and the opposing springs in the parallel rings/support beam interfaces may accommodate this movement but continuously draw the support ring back to vertical. In some embodiments, the opposing spring(s) 930 in the bottom chord connectors may also act as a shock absorber to prevent the carriage impacting against the containers when operating over poor track conditions.

Figures 10A, 10B, 10C:
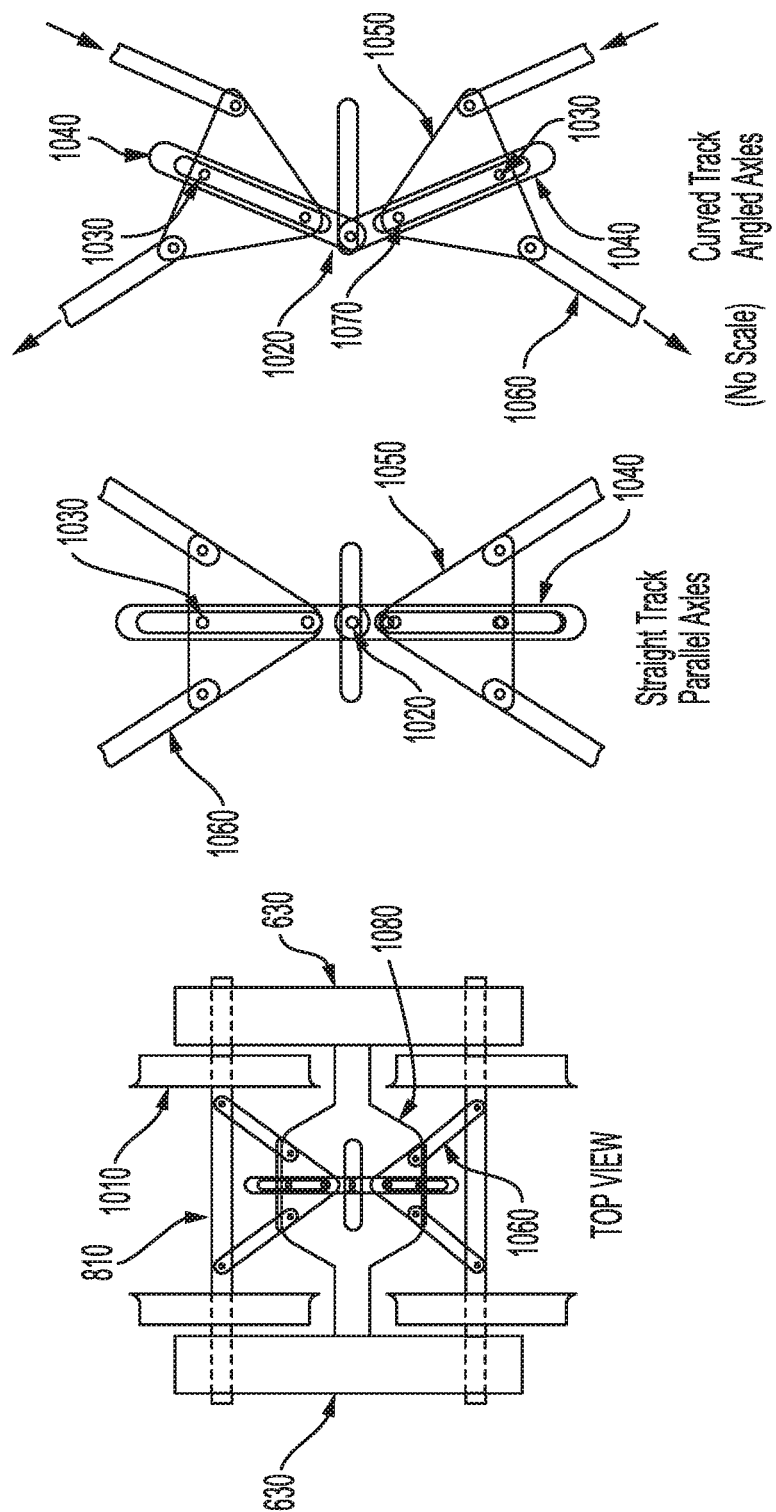
FIG. 10A is a top view of a block diagram of an example carriage steering mechanism, according to an embodiment of the invention.
FIG. 10B is an example view of a block diagram of an example carriage steering mechanism on a straight track with parallel axles, according to an embodiment of the invention.
FIG. 10C is an example view of a block diagram of an example carriage steering mechanism on a curved track with angled axles, according to an embodiment of the invention.

In various embodiments, the carriages may also be equipped with a steering mechanism. For example, FIG. 10A shows a top view of a block diagram of an example carriage steering mechanism, according to an embodiment of the invention. In various embodiments, the carriage steering mechanism may include at least one slip point 1020, one or more pivot points 1030, one or more slotted bars 1040, one or more triangular plates 1050, one or more connecting rods 1060, and/or one or more other components. In various embodiments, the framework 1080 supporting the steering mechanism may be attached to the support beams 630. As shown in FIG. 5A and FIG. 5B, support beams 630 are designed with horizontal slots to accommodate the movement of the carriage axles caused by the steering mechanism. In various embodiments, adequate room is also be provided between the carriage wheels and support beams to permit this steering action. In some embodiments, suspension springs and/or shock absorbers may also be provided between the carriage axles 810 and support beams 630 to improve ride characteristics. In some embodiments, a carriage steering mechanism may cause each axle 810 to have a direct mechanical link to the truss directly above it causing them to always remain perpendicular to one another resulting in the point of intersection of the two axles always approximating the center of the curve's radius.

Figure 10E:
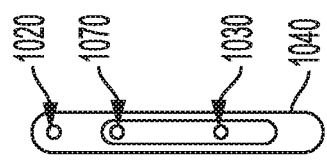
FIG. 10E is a top view of a block diagram of an example slotted bar of an carriage steering mechanism, according to an embodiment of the invention.
Figure 10D:
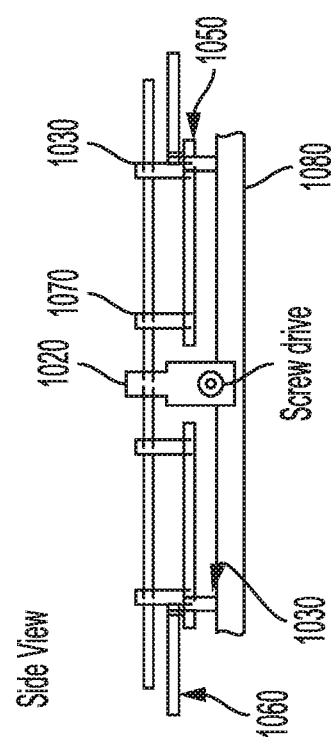
FIG. 10D is a side view of a block diagram of an example carriage steering mechanism, according to an embodiment of the invention.

In various embodiments, each coupler may be configured with internal gears to measure the degree to which the two trusses it supports deviate from a straight line, providing an accurate measure of the curvature of the track on which the carriage is operating at any point in time. To illustrate, FIG. 10B shows an example view of a carriage steering mechanism on a straight track with parallel axles, and FIG. 10C shows an example view of a carriage steering mechanism on a curved track with angled axles. To further illustrate the carriage steering mechanism, FIG. 10D shows a side view of a block diagram of an example carriage steering mechanism, and FIG. 10E shows a top view of a block diagram of an example slotted bar of an carriage steering mechanism, according to an embodiment of the invention. A mechanical linkage from the coupler to the carriage steering mechanism may adjust the angle between the carriages axles 810 to match the angle sensed by the coupler with the degree of track curvature measured by the extent to which adjacent trusses deviate from a straight line. In other words, the angle between the carriage axles 810 may be adjusted so the point of intersection of the carriages' axles will approximate the center of the curve's radius. This may cause carriage wheels 1010 to steer through the curve, reducing the friction between the wheels and the rails, which should extend equipment life, reduce wear on the rails, and improve the energy efficiency of the train's operation. For example, a screw-type mechanism within the supporting framework 1080 could shift slip point 1020 from side to side within its slot causing slotted bars 1040 to pivot triangular plates 1050 around their pivot point 1030 causing connecting rods 1060 to adjust the orientation of the axles.

In various embodiments, one or more alternative structures may be utilized in the carriage described herein in addition to and/or instead of the three-ring design comprising two parallel rings 610 and support ring 620 described herein (and depicted, for example, in FIG. 6A and FIG. 6B). For example, alternative structures may be utilized (and be radically different) provided it includes curved arches with gliding interfaces at support beams 630 and the coupler, secures the pivot point 650, and provides adequate room for the tilting movements of the pivoting coupler assembly and its integrated flywheel 660.

In various embodiments, the carriage design may also include some flexibility at the pivot point 650 to cushion abrupt sideways jerks to the coupler mechanism if, for example, one rail's elevation drops suddenly relative to the other. Such a drop may move the pivot point 650 down and to the side, forcing the coupler first toward the dip and then away from it as the load shifts. A mechanism to dampen this action without affecting the cornering abilities of the system described herein is described herein with respect to FIGS. 6A, 8A, and 8D. For example, slots with opposing springs may be designed into the pivot brace 840 which secures pivot point 650—a horizontal slot at pivot point 650 and vertical slots at each end where it attaches to parallel rings 610. The length of these slots and the resistance of the springs could be made adjustable to respond to track conditions and desired ride characteristics.

Drive Mechanism

In various embodiments, the flywheel at the center of each carriage (e.g., flywheel 660) may comprise an integral part of the drive mechanism and may be used to store potential and/or mechanical energy generated when braking. In various embodiments, electrical generators or batteries mounted on hanging platforms that attach in the same manner as the freight containers may power the trains. Standard commercial generators, possibly modified to burn compressed natural gas (CNG) rather than diesel fuel, may collectively feed a power grid serving the entire train. The length of the train, the weight of the train's load, and the terrain to be traveled may determine the number of generators and/or power cells placed on each train, with a spare or two to insure against mechanical failure. The controls for the drive mechanism may ensure that each carriage is contributing equally to the effort of propelling or stopping the train regardless of the rotation speed of individual flywheels in order to minimize any longitudinal stress on the couplers and provide them with the freedom of movement required to optimize system performance. In the event of a failure in the drive mechanism of a carriage, it may shift to neutral and disengage so the train can keep moving.

Some embodiments may use one or more electric motors configured to spin the flywheels which will be linked to the drive wheels using variable speed transmissions. These transmissions will draw energy from the flywheels when accelerating or cruising, disengage when coasting, and store energy in the flywheels when braking. The amount of electricity consumed by the motors to maintain the rotation speed of the flywheels within their predefined range may determine how many of the train's generators will be operating and at what capacity. Although flywheel drive shaft 850 is shown to be straight in FIG. 8A and FIG. 8D, in some embodiments flywheel drive shaft 850 may include universal joints and overlapping sleeves between the center of the flywheel 660 and support ring 620 to accommodate the pivoting movements of the PCA framework supporting flywheel 660. Although shown to extend through and beyond support ring 620 in FIGS. 8A-D, in some embodiments the flywheel drive shaft 850 may terminate inside support ring 620 to accommodate alternative placements of the motors and transmissions that will drive the train.

In various embodiments, as the train approaches a terminal, the rotation speed of the flywheels may be allowed to slow so the braking process can be used to restore flywheels to the high end of the flywheels' operating range in anticipation of the effort required later to accelerate the train from a standing start. The potential energy stored in the flywheels may also be used to maneuver the trains while at the terminals so the generators can be shut down or swapped out. The trains may also be connected to the terminal's power supply if the stored energy is inadequate to complete all necessary terminal operations and to spin-up the flywheels on any carriages added to the train at the terminal. This may reduce noise and/or preserve air quality in the vicinity of terminals.

Control Cars

In various embodiments, the enhanced cornering characteristics described herein are at least partially derived from the fact that the coupled support trusses—the top chord of the train—will not stretch after the pivoting coupler assemblies have shifted them toward the center of a curve. For this feature to successfully increase the average cornering speed of the train, one or more of the first few carriages may be moved around the curve in order to place an adequate anchoring mass at the front end of the top chord. Likewise, the rear of the train may also be anchored to counteract any whiplash effect as the last few carriages move through the curve. In various embodiments, control cars may be situated at the front and/or back of the train to sense changes in the curvature in the track and then supply this anchoring effect. For example, the control car and its ballast weight may help provide this anchoring mass by controlling the response of the first few containers that enter a curve and/or counteracting the whiplash effects of last few containers as they leave the curve. In some embodiments, a control car may also house the operator's cabin.

Figure 11:
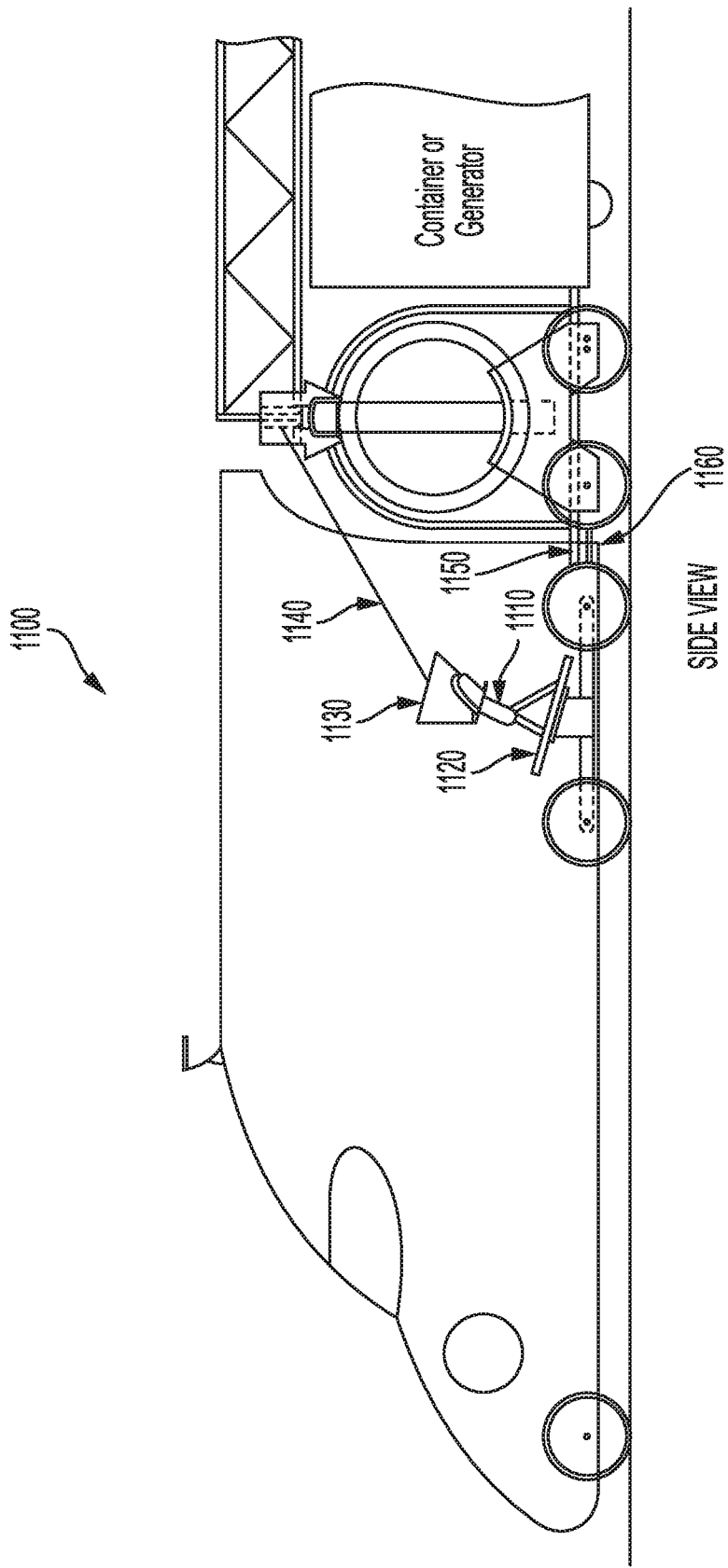
FIG. 11 is a side view of a block diagram of an example control car with a shifting ballast weight, according to an embodiment of the invention.

An example mechanism for providing the control cars with the desired anchoring effect described above is illustrated in FIG. 11. For example, FIG. 11 illustrates a control car 1100, according to an embodiment of the invention. In various embodiments, control car 1100 may include an arched support beam 1110, a beam support plate 1120, a ballast weight 1130, and/or one or more other components. In various embodiments, control car 1100 may not have a support truss, and thus does not have a pin to insert into a pin-coupler assembly for connecting with an adjacent carriage. Accordingly, a mechanism is required for connecting the control car with the adjacent carriage's top chord (i.e., the topside structure).

In various embodiments, control car 1100 may be connected to an adjacent carriage via at least a top chord connection 1140, a bottom chord connection 1150, and/or a rigid third connection 1160. In various embodiments, top chord connection 1140 may comprise a chain or similar flexible cable that attaches to the top chord of the adjacent carriage at the pin-coupler assembly or some other coupling mechanism to connect the adjacent carriage's coupler to the ballast weight of control car 1100. In various embodiments, bottom chord connection 1150 may connect control car 1100 to the adjacent carriage at its bottom chord connector 940. In various embodiments, the bottom chord connection 1150 may include a mechanism (e.g., a hydraulic assist) that would push the swinging arm 820 of the adjacent carriage toward the outside of the curve to supplement the force exerted by the shifting ballast weight 1130 in pivoting that carriage's coupler toward the inside of the curve. This device may also allow a rear control car 1100 to initiate the shifting of the adjacent carriage's coupler 670 just prior to entering the curve in its effort to resist any anticipated whiplash. In various embodiments, in addition to the connections to the top and bottom chords, a rigid third connection 1160 may comprise an additional coupling between the control car 1100 and the adjacent carriage. In various embodiments, rigid third connection 1160 may have a geared mechanism and/or other means to detect that the train is entering a curve. This may be similar to the mechanism inside couplers 670 configured to detect and measure the degree to which adjacent trusses 100 deviate from a straight line. In various embodiments, a rigid third connection 1160 may prevent the shifting ballast weight 1130 from drawing the adjacent carriage closer to the control car so that all of the force it exerts may be used to pivot the adjacent PCA and shift its coupler 670.

Figure 12A:
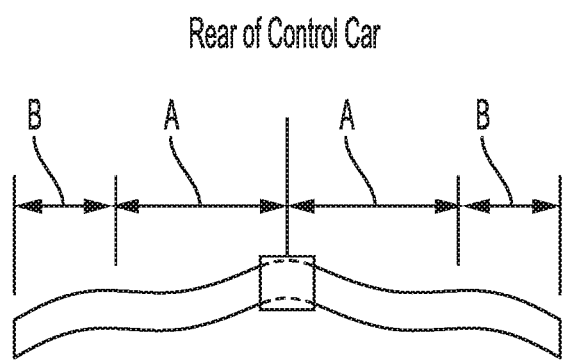
FIG. 12A is a top view of a block diagram of an example arched support beam of the example control car depicted in FIG. 11, according to an embodiment of the invention.
Figure 12B:
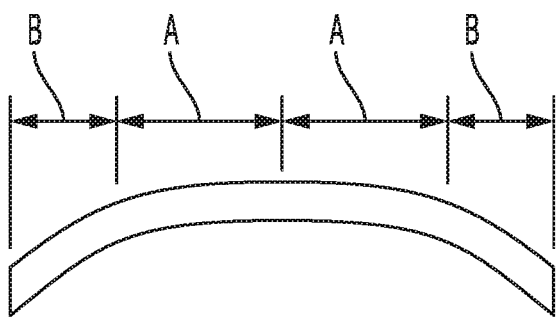
FIG. 12B is a front view of a block diagram of an example arched support beam of the example control car depicted in FIG. 11, according to an embodiment of the invention.
Figure 12C:
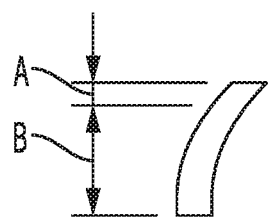
FIG. 12C is a side view of a block diagram of an example arched support beam of the example control car depicted in FIG. 11, according to an embodiment of the invention.

In various embodiments, control car 1100 may be configured to utilize ballast weight 1130, which may be configured to roll from side to side on arched support beam 1110 (which is also depicted in FIGS. 12A, 12B, and 12C described further herein). In various embodiments, arched support beam 1110 may be tilted toward the rear of control car 1100 and mounted on a pivoting support plate 1120 installed on an incline. In various embodiments, support plate 1120 may be rotated by a mechanism in rigid third connection 1160. Rigid third connection 1160 may be articulated and used to sense when the train enters a curve and then rotate support plate 1120 to cause ballast weight 1130 to shift toward the inside of the curve. For example, when rigid third connection 1160 between control car 1100 and the adjacent carriage detects that the train is entering a curve, mechanical linkages will cause support plate 1120 beneath arched support beam 1110 to pivot. Since arched support beam 1110 is installed on an incline, as support plate 1120 pivots, the end of support beam 1110 toward the inside of the curve drops while the other end is raised so that gravity will promptly move ballast weight 1130 to a position that is both lower and toward the inside of the curve.

In various embodiments, ballast weight 1130 may be sized to help initiate and sustain the rotation of the adjacent pivoting coupler assembly (PCA) just as centrifugal force and momentum begin to swing the container under the adjacent truss toward the outside of the curve. In a preferred embodiment, since the bottom chord connectors (which are depicted in FIG. 9) permit only limited sideways movement until stretched, this shifting of the lead coupler assembly helps initiate a chain reaction that ripples throughout the length of the train as each carriage enters the curve. In various embodiments, the shifted ballast weight 1130 may anchor the front of the train until the first few carriages have moved through the curve; after which the first few carriages will anchor the carriages that follow.

In some embodiments, these same principles may apply to a rear control car. In an embodiment in which a rear control car with a ballast weight is utilized, the ballast weight of the rear control car may begin shifting prior to reaching the curve in order to position itself to resist a whiplash at the rear of the train. As mentioned above, a hydraulic assist attached to lower chord connection 1150 may assist the ballast weight in its effort to shift the adjacent coupler 670. Knowing the speed and length of the train may enable an onboard computing system to compute when the rear control car is approaching the curve. When the track straightens, gravity will return the adjacent container and coupler assembly to a vertical position at the same time that the arched support beam in the control car (e.g., arched support beam 1110 of control car 1100) is returned to its normal position (e.g., perpendicular to the tracks). The combination of these two actions may return the rolling ballast weight to the top of the arch and center it between the rails.

Figure 12D:
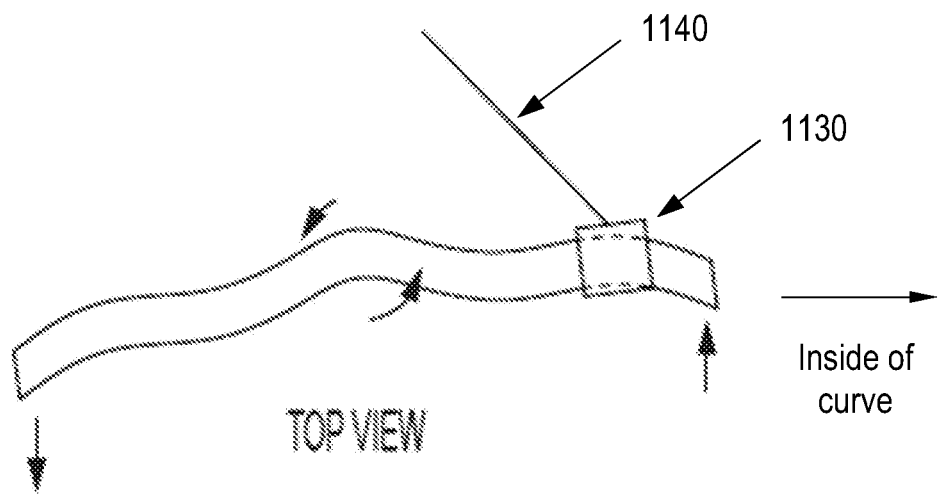
FIG. 12D is a top view of a block diagram of an example arched support beam of the example control car depicted in FIG. 11 as the train goes around a curve, according to an embodiment of the invention.
Figure 12E:
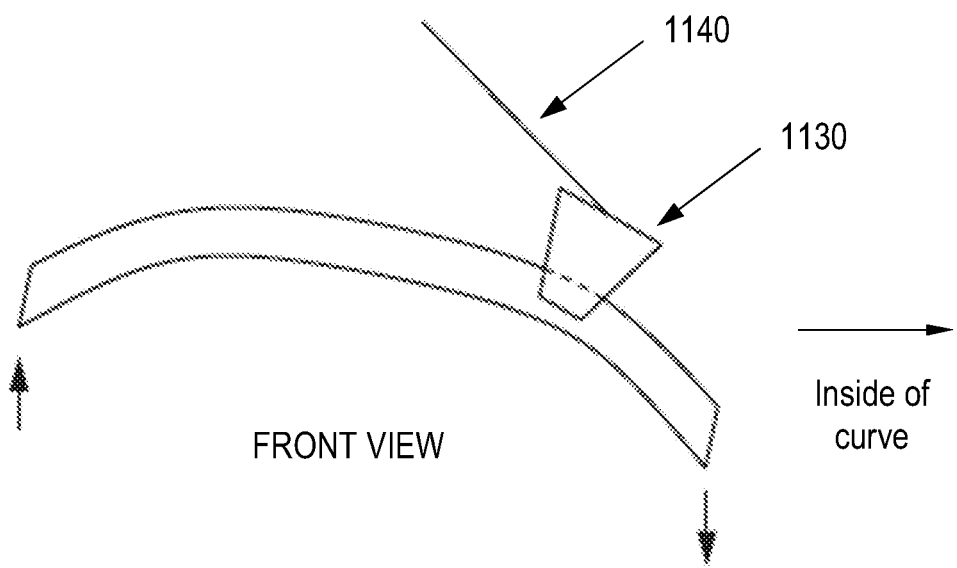
FIG. 12E is a front view of a block diagram of an example arched support beam of the example control car depicted in FIG. 11 as the train goes around a curve, according to an embodiment of the invention.

FIG. 12A illustrates an example top view of arched support beam 1110, FIG. 12B illustrates an example front view of arched support beam 1110, and FIG. 12C illustrates an example side view of arched support beam 1110, according to one or more embodiments of the invention. In various embodiments, segment A of arched support beam 1110 may be designed to quickly move ballast weight 1130 over the inside wheels of the curve even before the attached coupler assembly begins to pivot. In some embodiments, any additional movement of ballast weight 1130 on segment B will reflect the degree to which the attached coupler assembly has pivoted. The precise geometry of the arched support bean 1110 together with the incline angle of support plate 1120 on which it rests may allow gravity acting on the ballast weight to quickly move it to a location that encourages a shifting of the adjacent coupler and anchors the top chord of the train to the inside of the curve at it enters the curve which may allow increased cornering speed. For example, FIG. 12D shows an example top view of arched support beam 1110 of the example control car depicted in FIG. 11 as the train goes around a curve, and FIG. 12E shows an example front view of arched support beam 1110 as the train goes around a curve, according to an embodiment of the invention. On a curved track, the end of support beam 1110 on the inside of the curve drops and moves to the rear, causing gravity to shift ballast weight 1130 over the inside wheels. Because support plate 1120 is on an incline, as support beam 1110 is rotated, one side drops as the other is raised, forcing the ballast weight to the correct side.

In some embodiments, in addition to the top and bottom chord connections that may be involved in the rotation of the adjacent coupler assembly, the third rigid connection between the control car and the adjacent carriage may help resist the tendency of the control car and the carriage to be drawn together as the ballast weight shifts. Due to the complex relationship between the control car and an adjacent carriage, in some embodiments, the control car and the adjacent carriage may be more permanently attached and the first load unit may be a generator or battery pack so that individual control cars can move under their own power. In some embodiments, cameras installed in individual control cars may allow operators to drive the train from either end and provide visibility when backing up.

In various embodiments, mechanical linkages may be used to connect and activate critical functions within control car(s) and carriages. For example, mechanical linkages may be more robust and stable, easier to maintain, and less prone to failure.

The improved intermodal transportation system described herein may facilitate, for example, ocean-to-river transfers and/or land-to-water transfers. Ocean-going ships and river barges could be designed to link up and exchange containers while on calm water in a harbor without docking or using cranes but rather in a roll-on, roll-off manner. The improved mobility of wheeled containers may facilitate moving containers on both ships and barges, within each level and between levels, so the containers can be sorted on board between stops and departing containers can be placed near the exit ramps to facilitate prompt transfers. The notches 470 shown in apron 450 may improve clearance at grade changes (as described above) when used with ramps equipped with elevated channels for the wheels. This feature may be particularly useful when transferring containers between river barges and land-based terminals since tidal action and water levels may cause their elevation relative to one another to vary widely.

System Advantages

Embodiments of an improved intermodal transportation system may include a new class of railroad equipment where instead of coupling conventional railcars together, the trains are assembled from a series of standardized, interchangeable components (e.g., carriages, trusses, control car) that allow freight containers and power generators to be exchanged in an automated fashion without lifting and without disengaging any of the train's rolling stock components. Since the freight containers are configured to easily separate from the train, the rolling stock plays no role in the sorting of freight by destination, so classification yards are not needed to drop off or pick up loads at intermediate locations so this equipment can remain engaged in line haul movements. The sorting of freight by destination may take place inside automated terminals between train arrivals.

In some implementations, various components described herein may be of an entirely new design and be unable to interact with, or need to conform to, any existing railroad equipment (other than, for example the tracks and switches). In some embodiments, all components described herein may be designed for ease of maintenance, especially the replacement of wear items. In some embodiments, the design of the components described herein may incorporate the latest in modern control, safety, and diagnostic equipment, such as Positive Train Control, diagnostic sensors to monitor equipment performance and predict failures before they occur, measure rail bed defects and report their location, and attach RFID tags to all components to continuously track their location, report their condition, and availability for use, and in the case of freight containers, if they are loaded, what is onboard, where is it going and who owns it.

With conventional railroad equipment, each conventional railcar and coupler must be strong enough to pull a hundred or more loaded cars up a grade. In trains and train components (e.g., carriages, trusses, and/or other components) designed according to embodiments described herein, the motive power may be distributed evenly throughout the train, eliminating linear stress present in conventional equipment. The embodiments described herein may also permit a lighter equipment design with an improved tare/load ratio, better fuel economy, and/or less wear and tear on rail infrastructure. A rigid, articulated spine may eliminate coupling and slack action from train operations. Conventional coupling procedures are essentially a controlled crash at 5 mph, which is both loud and violent and can damage sensitive freight. But in trains and train components according to the embodiments described herein, the rigid spine and distributed motive power may reduce the wheel/rail wear at curves and lower the risk of derailment by eliminating string-lining and buff-force events from train operations.

These operating characteristics allow for an improved intermodal transportation system that overcomes many of the limitations of conventional railroad equipment and dramatically improves the performance and competitiveness of rail intermodal service so it can extend its reach into smaller markets, shorter hauls, and smaller loads. This improved equipment design may hold the potential to shift a significant volume of freight from the highways to the rails, lowering the societal costs and environmental damage caused by trucking. Any reduction in truck volume would reduce the pavement damage caused by heavy trucks, extending the useful life of existing highways and bridges.

Government budgets would also benefit from the lower highway maintenance costs and a potential deferral in the construction of additional lane-miles needed to reduce congestion and maintain highway service levels critical for an efficient economy. According to a recent CBO report, federal, state, and local governments now spend $177 billion each year on highway infrastructure, yet the American Society of Civil Engineers grades our infrastructure a "D" with forty-four percent of America's major roads in poor or mediocre condition. Driving on roads in need of repair costs U.S. motorists $128.9 billion a year in extra vehicle repairs and operating costs ($605 per motorist), according to TRIP, a national transportation research group. The Federal Highway Administration estimates that each dollar spent on road, highway, and bridge improvements returns $5.20 in the form of lower vehicle maintenance costs, decreased delays, reduced fuel consumption, improved safety, lower road and bridge maintenance costs, and reduced emissions as a result of improved traffic flow. These facts demonstrate that a meaningful shift in freight volume to the railroads will provide societal benefits well beyond lower GHG emissions, better air quality, and improved highway safety.

In various implementations, automated terminal operations may also represent an advantage of the improved intermodal transportation system described herein over conventional systems. The container exchange and train assembly stations that are integral to the sorting process may be placed indoors to preserve equipment and reduce noise transmission. Using the energy stored in the flywheels and/or tapping into the terminal's power supply may allow the generators to be shut down during terminal visits. Consequently, an improved intermodal terminal according to the various embodiments described herein may be a quiet neighbor that produces little air pollution and is therefore less likely to generate political opposition.

Since spare containers and trusses may be stored vertically, terminal footprints may be smaller than conventional intermodal terminals, beneficially allowing them to be located closer to population centers to reduce drayage costs. Some containers could be offloaded directly onto flatbed trucks waiting in adjacent, sunken drive lanes to enable a near immediate truck departure for final delivery. Others may be held in the terminal and added to a later train headed in the right direction.

In various implementations, routing software may group containers by destination as components of the intermodal system (e.g., trains, control cars, carriages, containers, inventory/goods, and/or other components) move through the transportation infrastructure in order to minimize downstream terminal delays. Departing containers and refueled generators may be placed at specific queuing stations (e.g., terminals, maritime ports, CESs), where a train could be stopped when arriving containers and generators are positioned at a particular CES. Multiple exchanges may occur simultaneously so the number of CESs installed at each terminal can be a function of freight volume.

In various implementations, enhanced equipment utilization may also represent an advantage of the improved intermodal transportation system described herein over conventional systems. A typical railcar is producing revenue, that is loaded and moving, only about 10% of the time. By separating the freight containers from the rolling stock and sorting them in automated terminals between train arrivals, embodiments described herein may beneficially not require the need for classification yards, thereby enabling the majority of equipment to remain in revenue-producing service a far greater portion of the time. This may beneficially lower equipment capital cost per unit of carrying capacity. This same advantage may accrue to drayage operation since drivers will typically be loading and unloading containers or internal racks rather than handling the freight inside.

Railroads often include a second locomotive with each train to insure against stranding. A standard generator may be a fraction of the cost of a locomotive, providing a more granular backup and power assist, and due to component designs described herein, any required maintenance, repair, or inspection may require only a minimal equipment investment be taken offline.

In various implementations, the improved intermodal transportation system described herein may provide an improved suspension compared to conventional systems. Various components described herein may act as part of the suspension system, isolating the containers from the impacts of uneven rail beds and protecting the freight from damage. Any reaction by a particular container to an abrupt movement by one of the wheels of the carriage hosting the container may be reduced, delayed, and/or cushioned by the flexibility built into the design. The elimination of slack action and coupling in train operations will further protect the freight from damage.

These improved suspension characteristics and enhanced cornering characteristics (described above) should allow improved intermodal trains to operate at higher average speeds (perhaps even passenger train speeds) and potentially on tracks in relatively poor condition where conventional railroad equipment might be forced to reduce speed. At higher average speeds, transit times may be more competitive with trucking and equipment utilization metrics may improve even further, producing more ton-miles per unit of equipment investment. Relatively lightweight equipment and smaller loads should minimize any additional maintenance burden imposed on railroad infrastructure.

Small, mobile load units could move past the loading dock, allowing users to pursue productivity gains in their manufacturing, packaging, and distribution activities. A baseline design specifies a small, less than truckload (LTL) sized container, but equipping many users (such as package delivery companies) with four internal wheeled racks would further expand the flexibility of shipping services. For example, internal wheeled racks could be used to sort packages by destination while en route. Under this scenario, a specialized container exchange station may be provided to place an offloaded container onto a turntable, open its rollup doors, and pull out one or more of its internal racks, then rotate the container to insert replacement racks with the same or similar destination before returning the container to the train. In some embodiments, the internal racks could also be designed to carry specific items (e.g., automotive transmissions or dashboards) in order to reduce packaging and crating costs. These containers, or their racks, could then be rolled to the appropriate station in an assembly plant for final installation without further handling. Less packaging may also beneficially reduce the solid waste stream, providing, e.g., environmental and/or cost advantages. This approach may also bring the efficiency of intermodal transport to rack-sized loads as opposed to limiting it to unit trains as conventional equipment seems to do.

In some embodiments, components of the improved intermodal transportation system described herein may facilitate storing containers or racks at terminals, providing users with a distributed warehousing option. Inventory may be redirected among markets to meet anticipated regional demand fluctuations for goods, and may do so without requiring the shipping agency or client to handle the products, thereby reducing handling labor and incurring only rail transport costs while assuring that users' final deliveries include only local drayage as needed. In some cases, specialized industrial and distribution parks with onsite terminals have various structural features described herein. For instance, an automated conveyor system, which may operate on an overhead rail, could transport containers between the terminal and user facilities on a 24/7 basis. In this case, a major retailer could deliver loaded containers to regional stores overnight from a relatively remote, lower cost distribution center and use the internal racks to deliver inventory directly to the sales floor for restocking.

In some implementations, the improved intermodal transportation system described herein may provide more sustainable transportation compared to conventional systems. For example, steel wheels on steel rails are six to ten times more energy efficient than truck tires on paved roads. Lighter equipment design with its improved tare/load ratio and carriage steering mechanism should produce efficiency gains over conventional railroad equipment. Flywheels may be utilized to store and reuse much of the energy normally lost to braking and improved cornering characteristics may save energy by not having to slow the trains as much before a curve and then accelerate them back up to operating speed.

Facilitating the elimination of classification yard activities as described herein may also reduce fuel consumption, as Class 1 railroads may use over 200 million gallons of diesel fuel each year in yard switching alone. The use of CNG for both the line haul and drayage portions of the trip, with refueling stations at the terminals, would further reduce air pollutants. In time, advancements in battery technology may allow the trains and drayage trucks to be powered with batteries recharged with renewable energy for a zero-emission operation. In some cases, component designs may permit an early transition to a hybrid configuration by replacing some of the generators with battery packs. More stable pricing for transportation services may result since this system may be less impacted by driver shortages or fluctuations in fuel prices. The anticipated arrival of autonomous trucks with platooning capabilities may lower labor costs, but autonomous trucks are unlikely to be as energy efficient as rail transport or mitigate traffic congestion and pavement damage concerns.

Embodiments described herein may beneficially provide the railroad industry with improved shipping performance. In some embodiments, the carriages and/or other components described herein may be fully compatible with existing infrastructure, but may also anticipate that the braking and acceleration of the trains described herein may be more responsive than conventional equipment, allowing train slots that are shorter. This may provide an opportunity for the railroads to more fully utilize their existing asset base and expand the revenue generating potential of routes/paths without being limited by the capacity of their existing classification yards or putting any additional pressure on them and with only minimal additional wear on their infrastructure. As described herein, transferring loads between railroads using different gauges may be as simple as parking two trains next to one another and rolling the containers over.

Embodiments described herein may also beneficially facilitate coordination of the drayage operation with the line hauls and use a computerized routing system within individual terminal's service area to match pickups and deliveries to minimize costs and optimize service. This provides one point of contact for shippers, portal to portal, in what is now perceived as a rather chaotic marketplace that requires the use of a 3PL firm to coordinate shipments. By taking advantage of embodiments having a distributed warehousing option, even small companies may be able compete in supply chains that often require an efficient nation-wide distribution network.

The improved suspension and ride characteristics of various equipment embodiments described herein may be combined with the elimination of coupling and slack action to reduce freight damage. Since the freight may be moved in locked containers and/or, when not in route, housed in the controlled environment of indoor terminals and storage facilities, pilferage may be eliminated (or at the very least, reduced). Since, in some embodiments, our design anticipates that the system and its employees will generally handle containers and/or internal racks rather than their contents, breakage, shrinkage, and insurance rates should all be lowered. Embodiments may be able to deliver service that is competitive with trucking but at a lower cost. Finally, those shippers who utilize this clean technology whenever it meets their business objectives will demonstrate their commitment to sustainability, a measure of good corporate citizenship that is growing in importance.

For purposes of explanation, numerous specific details are set forth in order to provide a thorough understanding of the description. It will be appreciated by those having skill in the art that the embodiments described herein may be practiced without these specific details or with an equivalent arrangement. Accordingly, it is to be understood that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

In various instances, well-known structures and devices are shown in block diagram form in order to avoid unnecessarily obscuring the description. The components of block diagrams (e.g., modules, blocks, structures, devices, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. Other embodiments, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A train for transporting freight containers comprising:
   support trusses connected longitudinally at couplers, wherein the support trusses include connection components configured to removably grasp one or more freight containers from above; and
   freight containers suspended from the support trusses, wherein each of the containers is removably attached to at least one of the support trusses,
   wherein the connection components comprise mechanical hooks configured to removably grasp the freight containers from above.

2. The train of claim 1, wherein the support trusses and the couplers form an articulated spine at a top of the train.

3. The train of claim 1, wherein at least one of the freight containers includes one or more support loops located on a top side of the freight container, wherein the mechanical hooks are configured to removably grasp the one or more support loops.

4. The train of claim 3, wherein one or more safety latches on the one or more mechanical hooks are configured to prevent the one or more support loops from being jostled off the one or more mechanical hooks.

5. The train of claim 3, wherein the one or more mechanical hooks are attached to a rotating bar of the support truss, wherein the one or more mechanical hooks are configured to thread the one or more support loops when the rotating bar is rotated.

6. The train of claim 3, wherein the one or more mechanical hooks comprise tapered ends configured to thread the one or more support loops.

7. A train for transporting freight containers comprising:
   support trusses connected longitudinally at couplers, wherein the support trusses comprise at least one hollow chord configured to house electrical and/or control wiring for the train, and wherein the support trusses include connection components configured to removably grasp one or more freight containers from above; and
   freight containers suspended from the support trusses, wherein each of the containers is removably attached to at least one of the support trusses.

8. A train for transporting freight containers comprising:
   support trusses connected longitudinally at couplers, wherein the support trusses include connection components configured to removably grasp one or more freight containers from above; and
   freight containers suspended from the support trusses, wherein each of the containers is removably attached to at least one of the support trusses, wherein the support trusses include at least a first support truss and a second support truss connected longitudinally at a first coupler, and wherein the freight containers include at least a first container suspended from the first support truss and a second container suspended from the second support truss.

9. The train of claim 8, wherein the support trusses include at least a first support truss configured to accommodate at least two freight containers.

10. The train of claim 9, wherein the at least two freight containers include a first container and a second container, wherein the first container and the second container are connected at a centerline of a bottom plane of the first container and the second container.

11. The train of claim 8, further comprising a carriage connected to the first support truss and the second support truss, wherein the carriage includes the first coupler, and wherein the first container and the second container are connected to the carriage.

12. The train of claim 11, wherein the first container and the second container are connected to a swinging arm of the carriage.

13. The train of claim 12, wherein the bottom plane of the first container, the swinging arm, and the bottom plane of the second container form the bottom chord of the train.

14. The train of claim 12, wherein the swinging arm of the carriage is configured to allow at least a bottom plane of the first container and the second container to swing outward as the train enters a curve.

15. The train of claim 8, wherein at least one of the freight containers includes pivoting wheels on a bottom side of the freight container, wherein the pivoting wheels are configured to interface with pivoting floor plates of a terminal.

16. The train of claim 15, wherein the pivoting wheels are configured to interface with the pivoting floor plates of the terminal when a floor is elevated to contact the pivoting wheels of the freight container.

17. The train of claim 15, wherein the freight container is configured to roll off the train via the pivoting wheels when the pivoting floor plates are rotated and in a position perpendicular to tracks on which the train sits.

18. A train for transporting freight containers comprising:
support trusses connected longitudinally at couplers, wherein the support trusses include connection components configured to removably grasp one or more freight containers from above;
freight containers suspended from the support trusses, wherein each of the containers is removably attached to at least one of the support trusses; and
one or more power cells attached to one or more of the support trusses, wherein the one or more power cells comprise generators and/or battery packs.

19. The train of claim 18, wherein the one or more power cells supply electricity to a train-wide grid that supplies electricity to the carriages for locomotion.

* * * * *